(12) United States Patent
Kamijo

(10) Patent No.: US 8,467,080 B2
(45) Date of Patent: Jun. 18, 2013

(54) PRINTING CONTROL SYSTEM, PRINTING CONTROL SERVER, IMAGE FORMING APPARATUS, PROGRAM, AND PRINTING CONTROL METHOD

(75) Inventor: Kumiko Kamijo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1218 days.

(21) Appl. No.: 12/336,508

(22) Filed: Dec. 16, 2008

(65) Prior Publication Data

US 2009/0174894 A1    Jul. 9, 2009

(30) Foreign Application Priority Data

Dec. 26, 2007  (JP) .................................. 2007-333706

(51) Int. Cl.
*G06F 3/12* (2006.01)
*G03G 15/00* (2006.01)

(52) U.S. Cl.
USPC .......................................... 358/1.15; 399/80

(58) Field of Classification Search
USPC .......................................... 358/1.15; 399/80
See application file for complete search history.

(56) References Cited

U.S. PATENT DOCUMENTS

| 7,519,302 B2 | 4/2009 | Matsubara | |
| 2006/0104656 A1 * | 5/2006 | Tomita et al. | 399/80 |
| 2006/0233563 A1 * | 10/2006 | Matsuhara | 399/80 |

FOREIGN PATENT DOCUMENTS

| JP | 2006-99714 | | 4/2006 |
| JP | 2006295716 A | | 10/2006 |
| JP | 2007-018030 | * | 1/2007 |
| JP | 2007018030 A | | 1/2007 |

OTHER PUBLICATIONS

Chinese Office Action dated Apr. 13, 2011, regarding Application No. 200810190697.8.
Translation of Japanese Office Action dated dated Oct. 19, 2010 in regard to JP Patent Application 2008-288332.

* cited by examiner

*Primary Examiner* — Steven Kau
*Assistant Examiner* — Neil R McLean
(74) *Attorney, Agent, or Firm* — Fitzpatrick, Cella, Harper & Scinto

(57) ABSTRACT

To provide a mechanism for causing a printing apparatus in which a user logged to display data printable by the user, there is provided a printing control method in a printing control system in which the image forming apparatus includes the steps of transmitting the input user identification information to the printing control server, and displaying the printing data information list received from the printing control server, so that the printing data printable by the image forming apparatus and the printing data not printable by the image forming apparatus can be discriminated from each other.

18 Claims, 15 Drawing Sheets

| PRINTER NAME | ~131 |
| IP ADDRESS | ~132 |
| SCREEN/NO SCREEN | ~133 |
| SETUP LOCATION | ~134 |

| CARD NUMBER | ~141 |
| USER NAME | ~142 |

| PRINTER NAME | ~151 |
| IP ADDRESS | ~152 |
| PRINTER DRIVER NAME | ~153 |

| CARD NUMBER | ~161 |
| USER NAME | ~162 |
| PASSWORD | ~163 |
| FULL NAME | ~164 |

FIG. 22

PRINTER INFORMATION LIST

| PRINTER NAME | SETUP LOCATION | SCREEN/NO SCREEN | |
|---|---|---|---|
| Printer 1 | 1ST FLOOR EAST | SCREEN | IN SELECTION |
| Printer 2 | 1ST FLOOR WEST | NO SCREEN | |
| Printer 3 | 2ND FLOOR EAST | SCREEN | |
| Printer 4 | 2ND FLOOR WEST | NO SCREEN | |

○ IMMEDIATE PRINTING   ● LIST DISPLAYING   DETERMINE

☑ RESERVED PRINTING

FIG. 23

PRINTER INFORMATION LIST

| PRINTER NAME | SETUP LOCATION | SCREEN/NO SCREEN | |
|---|---|---|---|
| Printer 1 | 1ST FLOOR EAST | SCREEN | |
| Printer 2 | 1ST FLOOR WEST | NO SCREEN | IN SELECTION |
| Printer 3 | 2ND FLOOR EAST | SCREEN | |
| Printer 4 | 2ND FLOOR WEST | NO SCREEN | |

○ IMMEDIATE PRINTING   ○ LIST DISPLAYING   DETERMINE

☐ RESERVED PRINTING

PRINTING CONTROL SYSTEM, PRINTING CONTROL SERVER, IMAGE FORMING APPARATUS, PROGRAM, AND PRINTING CONTROL METHOD

BACKGROUND OF THE INVENTION

1. Field of the Invention

The present invention relates to a system which performs a login process based on card information read by a card reader, and enables to output printing data selected from a printing job information list (printing data information list) concerning authenticated users to a desired printing apparatus.

2. Description of the Related Art

In recent years, a printing system of so-called "pull print (storage print)" has been proposed. In this printing system, a printing request for printing data stored on a server is transmitted from a printer by only an authenticated user, and then the printing data is transferred from the server and output by the printer in response to the printing request. Thus, the printing data corresponding to the authenticated user can be output from the desired printer.

For example, Japanese Patent Application Laid-Open No. 2006-099714 discloses a printing system in which an IC card authentication process is performed by a multifunction machine, printing data of an authenticated user is identified by a printing management server, a printing command is transmitted to a printing server in which the identified printing data has been stored, and the printing data of the authenticated user is printed by a desired printer.

However, in Japanese Patent Application Laid-Open No. 2006-099714, the information being a list of the printing data is generated and transmitted to the printer, according to a classification of the printer that the user logged in and the logged-in user. For this reason, there is a problem that the printing data for which the logged-in user is coincident but the printer classification is different is not list-displayed.

Further, in Japanese Patent Application Laid-Open No. 2006-099714, in the printing operation, the user has to first memorize the classification of the printer designated by a computer, has to go to the setup location of the printer corresponding to the memorized printer classification, has to log in the relevant printer at the setup location, and then has to actually print the printing data. For this reason, if the user forgets the printer that he/she designated by the computer at the time of printing, he/she has to log in various kinds of printers to search for the printing data of his/her own.

In particular, in a large-scale office of the present day, various kinds of printers are set up and these printers are variously classified and used for various purposes. For example, if a user wishes to print image data only for the purpose of reading, the printer which can operate at high speed but can only perform monochrome printing is used. Further, if a user wishes to acquire book-bound prints, the printer which has a bookbinding function is used.

For these reasons, the printer drivers of which the number corresponds to the number of available printers are installed in the computer of each user, whereby the user has to properly use these printers (printer drivers) according to various purposes.

Further, in the computer, plural printer drivers each called a printer object can be formed for one printer (i.e., one printer driver). Therefore, if the plural printer objects are formed and printing setting that the user wishes to use is previously applied to each of the plural printer objects, it is possible for the user to save labor for changing the printing setting when actually performing printing. In this case, according as the number of printer drivers and/or the number of printing setting that the user wishes to use increase, the number of printer objects increases. For this reason, if a time elapses after the printing was instructed from the computer, there is a problem that the user forgets to which printer he/she instructed to output the data.

Furthermore, a printer generally includes a multifunction machine (multifunction printer) which has a copy function and a facsimile function and a printer (single-function printer) which can only a printing operation. Here, since the multifunction machine has a large-sized display screen so as to use the plural functions provided, the user who uses the multifunction machine can display a list of printing data and then select and print the printing data that he/she wishes to print, as described in Japanese Patent Application Laid-Open No. 2006-099714.

On the other hand, the single-function printer has only a display unit for displaying only character strings such as error information and the like, the user cannot select printing data by displaying a list of printing data.

Besides, in Japanese Patent Application Laid-Open No. 2006-099714, since only the printing data, which have been converted into a printer description language, are output from the computer via the printer driver and displayed as the list, it is difficult to easily print various data.

Further, in Japanese Patent Application Laid-Open No. 2006-099714, since the printing data, which have been converted into the printer description language, are output from the computer via the printer driver and instructed to be printed only by the printer that the user logged in, it is difficult to easily print various data.

SUMMARY OF THE INVENTION

The present invention provides a printing system, a control method of the printing system, a printing apparatus, and a storage medium of storing computer programs for the printing system and the printing apparatus, which all overcome such conventional problems as described above.

An object of the present invention is to provide a mechanism capable of causing a printing apparatus that a user logged in to display data printable by the user.

Another object of the present invention is to perform, even in case of performing a trial printing process in preference to other processes of a printing job, the process of the printing job without greatly changing processing order designated by an operator.

Other objects and features of the present invention will become apparent from the following description of the exemplary embodiments with reference to the attached drawings.

BRIEF DESCRIPTION OF THE DRAWINGS

The accompanying drawings, which are incorporated in and constitute a part of the specification, illustrate the exemplary embodiments of the present invention and, together with the description, serve to describe and explain the principle of the present invention.

FIG. 6 is a diagram illustrating printer information 130 to be stored in the printing management server 100 and the delivery server 200.

FIG. 7 is a diagram illustrating logged-in user information 140 to be stored in the printing management server 100, the delivery server 200 and the printer 600.

FIG. 8 is a diagram illustrating printer driver information 150 to be stored in the delivery server 200.

FIG. 9 is a diagram illustrating authentication information 160 to be stored in the authentication server 300.

FIG. 22 is a diagram illustrating a printer information list 802.

FIG. 23 is a diagram illustrating a printer information list 803.

DESCRIPTION OF THE EMBODIMENTS

Hereinafter, exemplary embodiments of a printing control system according to the present invention will be described in detail with reference to the attached drawings. Here, it should be noted that the constituent elements having substantially the same function are denoted by the same numeral, and thus duplicate description thereof will be omitted.

<First Embodiment>

(1: System Configuration)

Initially, the configuration of a printing control system according to the first embodiment of the present invention will be described with reference to FIG. 1.

Figure 1:
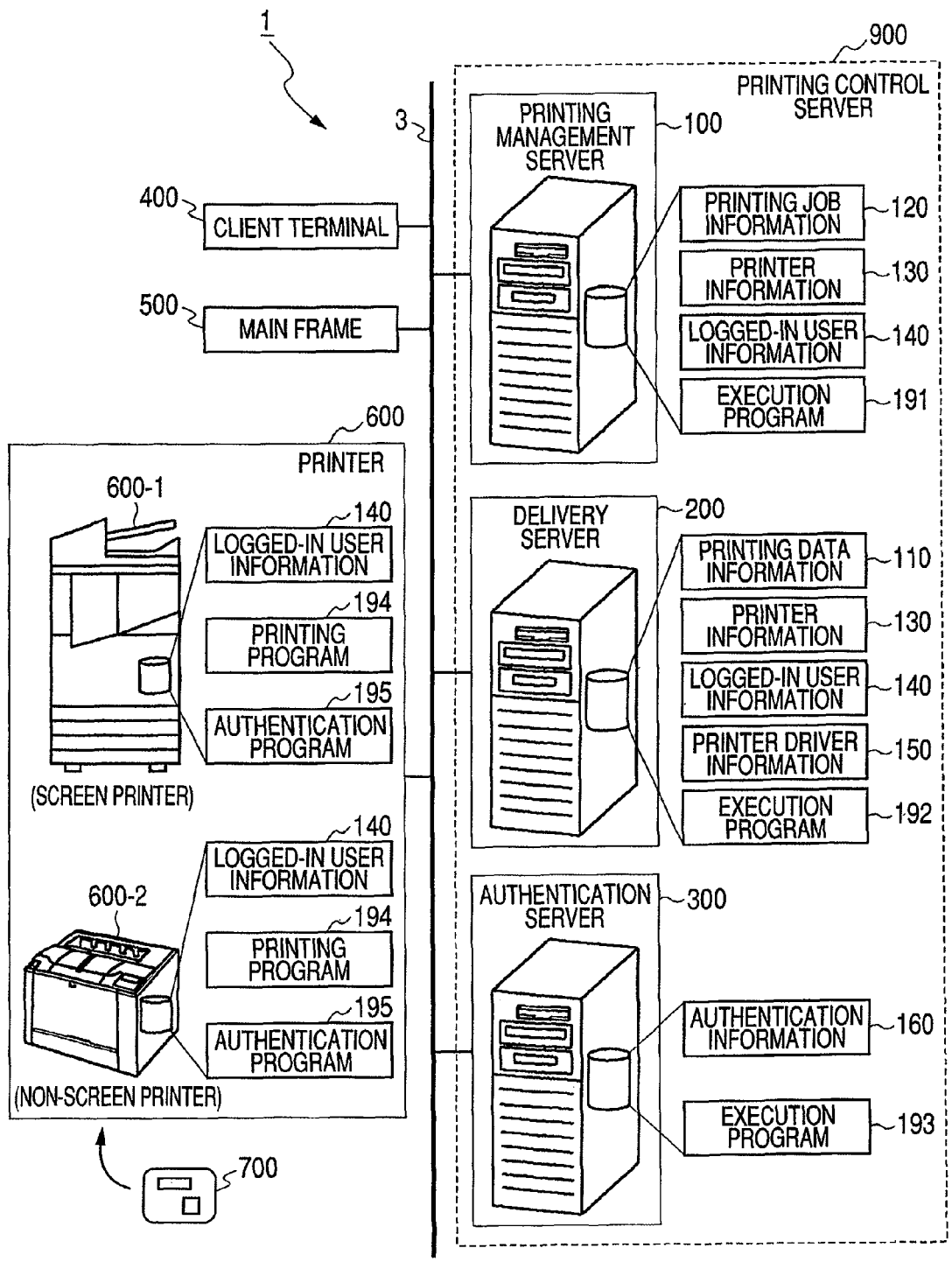
FIG. 1 is a diagram illustrating a system configuration of a printing control system 1.

FIG. 1 is a diagram illustrating the system configuration of a printing control system 1.

Incidentally, it should be noted that the configuration of the printing control system 1 illustrated in FIG. 1 is one example. That is, it is of course possible to adopt various configurations according to use applications and purposes.

In the printing control system 1, a printing management server 100, a delivery server 200, an authentication server 300, a client terminal 400, a main frame 500, and a printer 600, which is a printing apparatus acting as an image forming apparatus, are communicably connected together via a network 3 such as a LAN (local area network) or the like. Here, it should be noted that each of the printing management server 100, the delivery server 200 and the authentication server 300 may be independently provided (by means of different chassis), or may be provided as one server such as a printing control server 900 (by means of an identical chassis).

The printing management server 100 is the apparatus which manages printing of printing data stored in the delivery server 200. Here, it should be noted that "printing", which implies an output process by the printer 600, includes not only printing of the printing data on paper media but also an output process such as preview displaying or the like. The printing management server 100 requests the delivery server 200 to print the printing data, based on a printing request from the printer 600.

The delivery server 200 is the apparatus which temporarily stores therein the printing data transmitted from the client terminal 400 and the main frame 500. Further, the delivery server 200 extracts management information (printing data information 110) which is the bibliographic information of the stored printing data, and then transmits the extracted management information to the printing management server 100. Furthermore, the delivery server 200 delivers the printing data stored in the printer 600.

Figure 3:
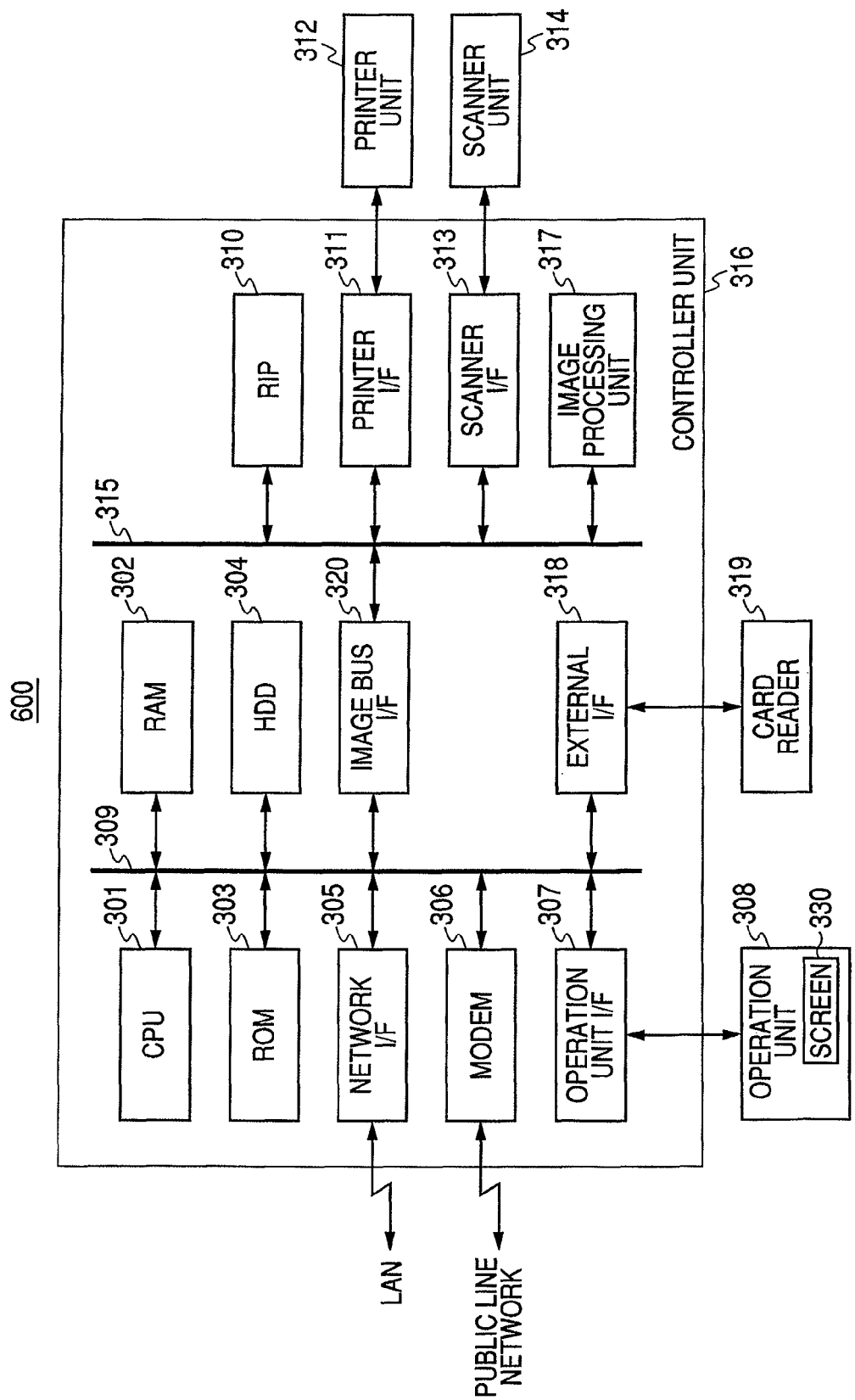
FIG. 3 is a block diagram illustrating a hardware constitution of a printer 600.

The authentication server 300 is the apparatus which performs authentication when a user of the client terminal 400 or the main frame 500 logs in the printer 600. In this case, a user name (user identification information), a password or a card number is used as authentication information. Here, the authentication information may be input to the printer 600 by storing at least any one of the user name, the password and the card number on a non-contact IC (integrated circuit) card 700 and then causing a user to bring the IC card 700 close to a card reader 319 (FIG. 3). Also, the authentication information may be directly input to the printer 600 by the user via an operation unit 308 (FIG. 3) of the printer 600. In any case, the user can actually use the printer 600 after the authentication.

The client terminal 400 is the apparatus to be used by a user. That is, the client terminal 400 generates the data to be printed, according to various applications. Then, the client terminal 400 converts the generated data into printing data having a format depending on the printer 600 by the printer driver, and then transmits the converted printing data to the delivery server 200.

The main frame 500, which is a basic host server computer, periodically transmits form data or the like to the delivery server 200. The original printing data such as the form data or the like to be transmitted from the main frame 500 to the delivery server 200 is printing data having a format not depending on the printer 600. The original printing data is converted into intermediate printing data and then stored in the delivery server 200. Also, the intermediate printing data is printing data having a format not depending on the printer 600.

The printer 600 is the image forming apparatus which prints the printing data. Here, the printer 600 may be a multifunction machine which has not only a printing function but also a facsimile communication function and/or a copying function. Further, it should be noted that the printer 600 includes a printer 600-1 having a screen (called a screen printer 600-1 hereinafter) and a printer 600-2 having no screen (called a non-screen printer 600-2 hereinafter). More specifically, the screen printer 600-1 is the printer which has a screen 330 (FIG. 3) such as a liquid crystal screen or the like on the operation unit 308, and the non-screen printer 600-2 is the printer which does not have any screen on the operation unit 308.

Figure 2:
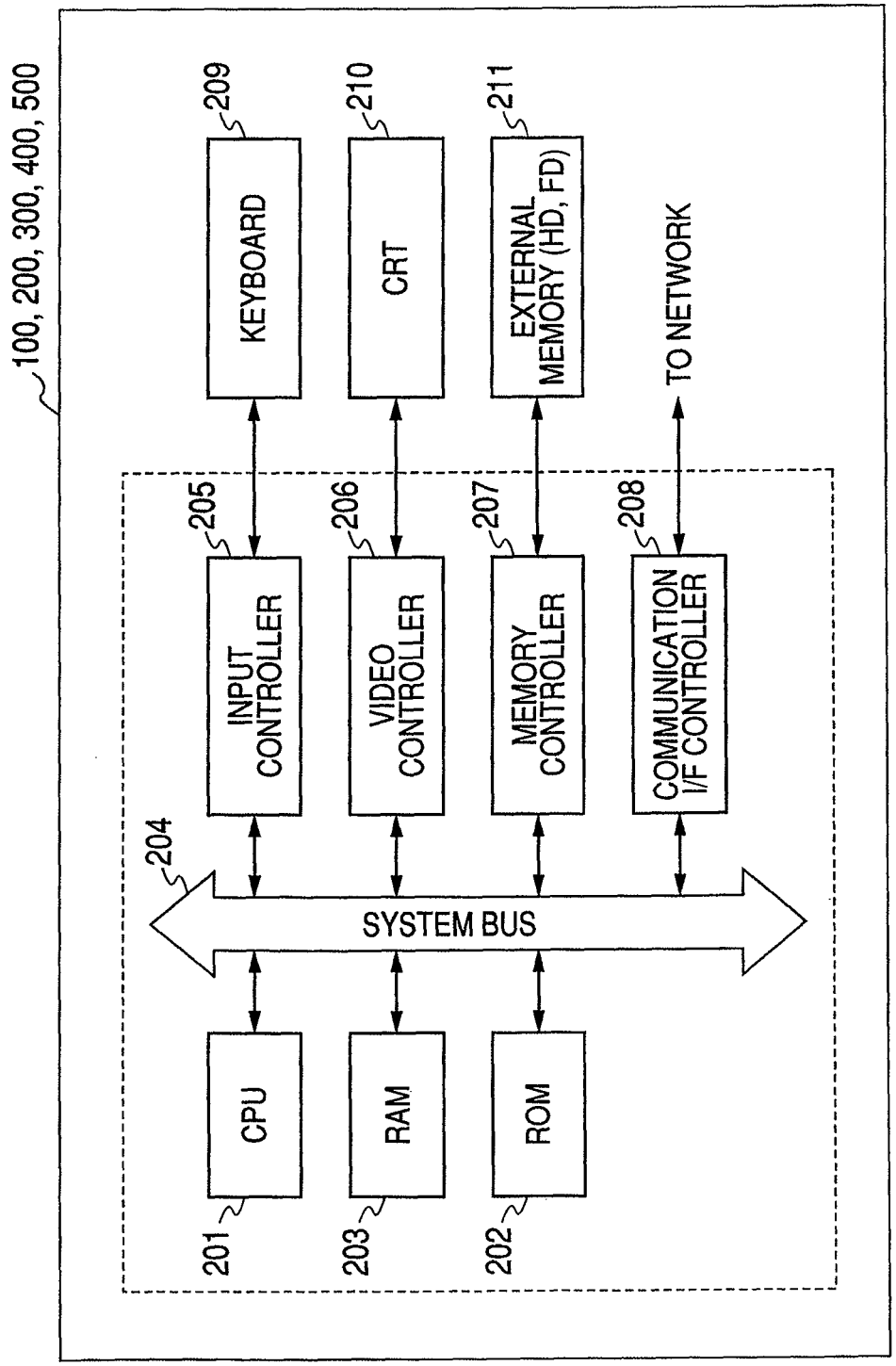
FIG. 2 is a block diagram illustrating a hardware constitution of an information processing apparatus which is applicable to a printing management server 100, a delivery server 200, an authentication server 300, a client terminal 400, and a main frame 500.

The printing management server 100 stores printing job information 120, printer information 130, logged-in user information 140, an execution program 191, an OS (operating system) and the like in a RAM (random access memory) 203 or an external memory 211 (FIG. 2).

Further, the delivery server 200 stores printing data information 110, printer information 130, logged-in user information 140, printer driver information 150, an execution program 192, an OS and the like in the RAM 203 or the external memory 211 (FIG. 2).

Furthermore, the authentication server 300 stores authentication information 160, an execution program 193, an OS and the like in the RAM 203 or the external memory 211 (FIG. 2).

Furthermore, the printer 600 stores logged-in user information 140, a printing program 194, an authentication program 195, an OS and the like in a RAM 302 or an HDD (hard disk drive) 304 (FIG. 3).

Incidentally, the printing data information 110 may be stored not only on the side of the delivery server 200 but also on the side of the printing management server 100, and the printing job information 120 may be stored not only on the side of the printing management server 100 but also on the side of the delivery server 200. The details of the printing data information 110, the printing job information 120, the printer information 130, the logged-in user information 140, the printer driver information 150 and the authentication information 160 will be described later.

(2: Hardware Constitution)

Next, the hardware constitution which is applicable to the printing management server 100, the delivery server 200, the authentication server 300, the client terminal 400, the main frame 500 and the printer 600 will be described with reference to FIGS. 2 and 3.

More specifically, FIG. 2 is the block diagram illustrating the hardware constitution of an information processing apparatus which is applicable to the printing management server 100, the delivery server 200, the authentication server 300, the client terminal 400, and the main frame 500.

A CPU (central processing unit) 201 totally controls respective devices and controllers connected to a system bus 204. Further, a BIOS (Basic Input/Output System), an OS and various programs necessary for achieving various functions to be executed by respective servers and/or client terminals are stored in a ROM (read only memory) 202 and/or the external memory 211. Further, the RAM 203 functions as a main memory, a working area and the like for the CPU 201, and the CPU 201 achieves the various operations by loading necessary programs to the RAM 203 and then executing the loaded programs.

An input controller 205 controls various inputs from a keyboard 209, and not-illustrated pointing devices such as a mouse and the like, and a video controller 206 controls displaying on displaying units such as a CRT (cathode ray tube) 210. Here, it should be noted that the display unit includes not only the CRT bus also a liquid crystal display and the like. The display units are used by administrators according to need, and not directly relative to the present invention.

A memory controller 207 controls accessing to the external memory 211 which stores therein a boot program, browser software, various applications, font data, user files, editing files, various data and the like. Here, it should be noted that the external memory 211 includes an HD (hard disk), an FD (flexible disk), a CompactFlash™ memory connected to a PCMCIA (Personal Computer Memory Card International Association) card slot via an adapter, and the like. A communication I/F (interface) controller 208 is connected to an external apparatus via a network and thus performs communication with the external apparatus. Thus, the communication I/F controller 208 performs communication control on the network. For example, the communication I/F controller 208 can perform Internet communication by using a TCP/IP (Transmission Control Protocol/Internet Protocol).

Incidentally, the CPU 201 performs a process (rasterizing process) of expanding an outline font to, for example, a display information area in the RAM 203, thereby enabling the CRT 210 to display various data. Further, the CPU 201 enables the user to instruct various processes by using a not-illustrated mouse cursor or the like on the CRT 210.

The programs (the execution program 191, the execution program 192, the execution program 193) for achieving the present invention are stored in the external memory 211, and then loaded to the RAM 203 according to need, whereby the loaded programs are executed by the CPU 201. Also, the definition files to be used when the programs are executed, and various information tables (the printing data information 110, the printing job information 120, the printer information 130, the logged-in user information 140, the printer driver information 150, the authentication information 160) are stored in the external memory 211.

FIG. 3 is the block diagram illustrating a hardware constitution of the printer 600.

The printer 600 includes a controller unit 316, the operation unit 308, the card reader 319, a printer unit 312 and a scanner unit 314. Here, it should be noted that the controller unit 316 controls the operations of the operation unit 308, the card reader 319, the printer unit 312 and the scanner unit 314.

Subsequently, the devices to be disposed on a system bus 309 will be described.

A CPU 301 is the processor which controls the whole system, and the RAM 302 is the system working memory to be used when the CPU 301 operates. Also, the RAM 302 acts as the program memory for recording programs and the image memory for temporarily storing image data. A ROM 303 is the memory which permanently stores therein data. More specifically, the boot program and various control programs are stored in the ROM 303.

The HDD 304 stores therein various programs for controlling the system, various image data, and the like. More specifically, the printing program 194 and the authentication program 195 are stored in the HDD 304.

An operation unit I/F 307 is the interface unit provided between the controller unit 316 and the operation unit 308. More specifically, the operation unit I/F 307 outputs to the operation unit 308 the image data to be displayed on the operation unit 308, and notifies the CPU 301 of the information {for example, a user name (user identification information), a card number, a password, etc.} input by the user from the operation unit 308. Incidentally, a screen 330 which acts as the display unit having a touch panel is provided on the operation unit 308 of the screen printer 600-1. Thus, if the buttons displayed on the screen 330 are depressed (or touched by a finger) by the user, various instructions are generated. On the other hand, the display unit for displaying text information such as error information and the like is provided, instead of the screen 330, on the operation unit 308 of the non-screen printer 600-2. That is, it is difficult for the user to select the printing job information by displaying a later-described printing job information list (printing data information list) on the non-screen printer 600-2.

A network I/F 305 is the interface unit provided between the controller unit 316 and a network such as a LAN or the like to input/output various data. A modem 306, which is connected to a public line network, inputs/outputs various data such as facsimile transmission/reception data and the like. An external I/F 318 is the interface unit which accepts various external inputs such as a USB (Universal Serial Bus) input, an IEEE (Institute of Electrical and Electronics Engineers) 1394 input, a printer-port input, an RS-232C (Recommended Standard 232C) input, and the like. Incidentally, the card reader 319 for reading information from the non-contact IC card 700 is connected to the external I/F 318. Consequently, the CPU 301 can control the information reading by the card reader 319 from the non-contact IC card 700 via the external I/F 318, and thus can obtain the information read from the non-contact IC card 700.

An image bus I/F 320 is the bus bridge which connects the system bus 309 to an image bus 315 for transferring the image data at high speed, and converts data constitutions. Incidentally, the image bus 315 is formed by a PCI (Peripheral Component Interconnect) bus or an IEEE 1394 bus.

Next, the devices disposed on the image bus 315 will be described.

An RIP (raster image processor) 310 expands, for example, vector data of a PDL (page-description language) code or the like into a bitmapped image. A printer I/F 311, which connects the printer unit 312 and the controller unit 316 to each other, performs synchronous/asynchronous conversion of the image data. A scanner I/F 313, which connects the scanner unit 314 and the controller unit 316 to each other, performs synchronous/asynchronous conversion of the image data.

An image processing unit 317 is the device which performs various image processes. More specifically, the image processing unit 317 corrects, converts and edits the input image data. Further, the image processing unit 317 performs printer correction, resolution conversion and the like for print output image data. Furthermore, the image processing unit 317 performs a rotation process to the image data, performs compression and extraction processes such as JPEG (Joint Photographic Experts Group) compression and extraction processes for multivalued image data, and performs compression and extraction processes such as JBIG (Joint Bi-level Image Experts Group) compression and extraction processes, MMR (Modified Modified READ) compression and extraction processes, MH (Modified Huffman) compression and extraction processes, and the like for binary image data.

The scanner unit 314 is the scanner mechanism which illuminates an image on an original paper, scans the illuminated image by a CCD (charge-coupled device) line sensor, and converts the scanned image into electrical signals as raster image data. Here, the original papers are set on a tray of an original feeder. Then, if the user operates the operation unit 308, the CPU 301 instructs the scanner unit 314 to start an original image reading operation. Thus, the original papers are fed one by one by the original feeder, and the images on the original papers are sequentially read.

The printer unit 312 is the printer mechanism which converts the raster image data into an image on a paper. Here, it should be noted that the printer unit 312 may adopt any of conversion systems such as an electrophotographic system which performs conversion by using a photosensitive drum, a photosensitive belt or the like, an inkjet system which directly print images on papers by emitting inks from micro-nozzles, and the like. The printer unit 312 starts a printing operation in response to an instruction from the CPU 301. Incidentally, the printer unit 312 is equipped with plural paper feeding stages so that the user can select different kinds of paper sizes and different kinds of paper directions, and with paper cassettes respectively corresponding to the plural paper feeding stages.

The operation unit 308 is to input operation instructions by the user, and to display various operation situations. Here, the operation unit 308 includes the liquid crystal display unit on which a touch panel sheet has been adhered. If the operation screen of the system is displayed on the operation unit 308 and then the button or the key displayed on the operation screen is touched, the corresponding position information is notified from the operation unit 308 to the CPU 301 via the operation unit I/F 307.

For example, the operation unit 308 has various operation keys such as a start key, a stop key, an ID (identification) key, and a reset key. Here, the start key, which is used to start the original image reading operation, includes a green/red LED (light-emitting diode) which indicates, according to a lighted color, whether or not the start key is available. The stop key has a function to stop the operation being performed, the ID key is used to input a user ID, and the reset key is used to initialize the setting by the operation unit.

Under the control of the CPU 301, the card reader 319 reads the information stored in the non-contact IC card 700, and notifies the CPU 301 of the read information via the external I/F 318. For example, a FeliCa™ (available from Sony Corporation) may be used as the non-contact IC card 700.

By the above constitution, the printer 600 can transmit the image data read from the scanner unit 314 onto the network 3, and can cause the printer unit 312 to print the printing data received from the network 3. Further, the printer 600 can cause the modem 306 to facsimile-transmit the image data read from the scanner unit 314 onto the public line network, and can cause the printer unit 312 to print the image data facsimile-received from the public line network.

(3: Information Stored in Printing Management Server 100, Delivery Server 200, Authentication Server 300, and Printer 600)

Next, the information to be stored in the printing management server 100, the delivery server 200, the authentication server 300 and the printer 600 will be described with reference to FIGS. 4, 5, 6, 7, 8 and 9.

(3-1: Printing Data Information 110)

Figure 4:
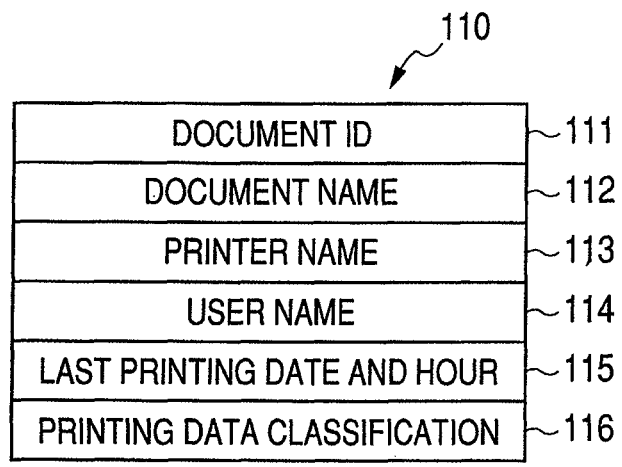
FIG. 4 is a diagram illustrating printing data information 110 to be stored in the delivery server 200.

FIG. 4 is the diagram illustrating the printing data information 110 to be stored in the delivery server 200.

The printing data information 110, which is the information concerning the bibliographic information of the printing data such as a form or the like, corresponds to a printing data management database. In any case, a document ID (printing data identification information) 111, a document name 112, a printer name (image forming apparatus identification information) 113, a user name (user identification information) 114, a last printing date and hour 115, a printing data classification 116 are included in the printing data information 110.

Here, the document ID (printing data identification information) 111 is the identification information of the printing data. That is, the respective processes are performed by designating the document ID (printing data identification information) 111. The document name 112 indicates the name of the printing data, and the printer name (image forming apparatus identification information) 113 is the identification information of the printer 600 of the printing destination at which the printing data is actually printed out. Here, the printer of the printing destination at which the printing data is printed may be called a printing-destination printer. Incidentally, if the printer 600 is not explicitly instructed by the user, a default printer name (image forming apparatus identification information) is recorded as the printing data information 110. The user name (user identification information) 114 indicates the owner of the printing data, and the last printing date and hour 115 indicates the date and hour when the printing data was printed for the last time. After a predetermined time elapsed from the last printing date and time 115 (for example, after 24 hours), the printing data information and the printing job information concerning the relevant printing data are deleted. The printing data classification 116 indicates whether the format of the printing data stored in the delivery server 200 is "the printing data generated by the printer driver" or "the intermediate printing data before the printing data is generated by the printer driver". Here, it should be noted that the "the printing data generated by the printer driver" is the printing data having a format depending on the individual printer 600 and "the intermediate printing data before the printing data is generated by the printer driver" is the printing data having a format not depending on the individual printer 600. However, in the actual printing, it is necessary to generate the printing data by the printer driver corresponding to the printing-destination printer 600.

(3-2: Printing Job Information 120)

Figure 5:
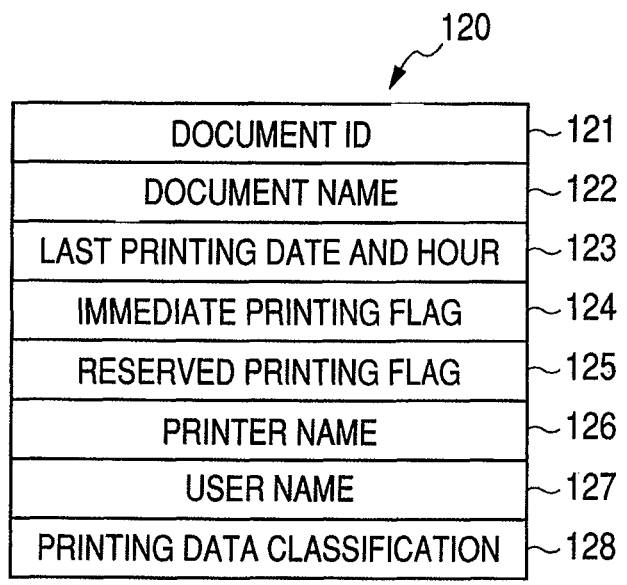
FIG. 5 is a diagram illustrating printing job information 120 to be stored in the printing management server 100.

FIG. 5 is the diagram illustrating the printing job information 120 to be stored in the printing management server 100.

The printing job information 120, which is the information for controlling the printer 600 to print the printing data, is generated based on the printing data information 110. In any case, a document ID (printing data identification information) 121, a document name 122, a last printing date and hour 123, an immediate printing flag 124, a reserved printing flag 125, a printer name (image forming apparatus identification information) 126, a user name (user identification information) 127, and a printing data classification 128 are included in the printing job information 120. Here, it should be noted that the user identification information, the printing data identification information and the image forming apparatus identification information at the printing destination are made correspondent to others and then stored, whereby it is possible to identify the printing data (substance).

Further, it should be noted that the document ID (printing data identification information) 121, the document name 122, the last printing date and hour 123, the user name (user identification information) 127 and the printing data classification 128 of the printing job information 120 are respectively the same as the document ID (printing data identification information) 111, the document name 112, the last printing date and hour 115, the user name (user identification information) 114 and the printing data classification 116 of the printing data information 110.

The immediate printing flag 124 is the flag indicating execution of the printing of the printing data by the printer 600. If the immediate printing flag 124 is standing, the authentication by the non-contact IC card 700 is performed, and then the printing data is immediately printed without waiting for a user's instruction. On the other hand, if the immediate printing flag 124 does not stand, the authentication by the non-contact IC card 700 is performed, and then the printing data is printed in response to the user's instruction.

The reserved printing flag 125 is the flag indicating a selected state in the printing job information list (printing data information list) to be displayed on the screen 330 of the operation unit 308 of the printer 600. More specifically, the printing job information to which the reserved printing flag 125 is standing is displayed in a selected state, but the printing job information to which the reserved printing flag 125 does not stand is displayed in a non-selected state.

The printer name (image forming apparatus identification information) 126 is the identification information of the printing-destination printer 600. Initially, the printer name (image forming apparatus identification information) 113 of the printing data information 110 is stored as the printer name (image forming apparatus identification information) 126 of the printing job information 120. However, if the printing-destination printer 600 is changed by a printing-destination printer changing process (FIG. 13), the printer name (image forming apparatus identification information) 126 is updated.

Incidentally, the document name 122, the last printing date and hour 123, the printing data classification 128 and the like of the printing job information 120 are respectively displayed as the printing job information list (printing data information list) on the screen 330 of the operation unit 308 of the printer 600.

(3-3: Printer Information 130)

FIG. 6 is the diagram illustrating the printer information 130 to be stored in the printing management server 100 and the delivery server 200.

Here, the printer information 130 is the information concerning the printer 600. Further, a printer name (image forming apparatus identification information) 131, an IP (Internet Protocol) address 132, a screen/no screen 133, and a setup location 134 are included in the printer information 130.

The printer name (image forming apparatus identification information) 131 is the identification information such as the name and the like of the printer 600, the IP address 132 indicates the allocated IP address of the printer 600 on the network, the screen/no screen 133 indicating whether or not the screen 330 is provided on the operation unit 308, and the setup location 134 indicates the whereabouts and the setup location of the printer 600.

Incidentally, the printer name (image forming apparatus identification information) 131, the screen/no screen 133 and the setup location 134 of the printer information 130 are displayed as a printer information list.

(3-4: Logged-In User Information 140)

FIG. 7 is the diagram illustrating the logged-in user information 140 to be stored in the printing management server 100, the delivery server 200 and the printer 600.

Here, the logged-in user information 140 is the information concerning the user who logged in the printer 600. Further, a card number 141 and a user name (user identification information) 142 are included in the logged-in user information 140. Incidentally, a password may be included in the logged-in user information 140.

The card number 141 is the card number of the non-contact IC card 700, and the user name (user identification information) 142 is the identification information such as a user name and the like. The logged-in user information 140 authenticated by the authentication server 300 is transmitted to and then stored in the printing management server 100, the delivery server 200 and the printer 600.

(3-5: Printer Driver Information 150)

FIG. 8 is the diagram illustrating the printer driver information 150 to be stored in the delivery server 200.

Here, the printer driver information 150 is the information concerning the printer driver corresponding to the printer 600. Further, a printer name (image forming apparatus identification information) 151, an IP address 152 and a printer driver name 153 are included in the printer driver information 150.

Here, it should be noted that the printer name (image forming apparatus identification information) 151 and the IP address 152 of the printer driver information 150 are respectively the same as the printer name (image forming apparatus identification information) 131 and the IP address 132 of the printer information 130 illustrated in FIG. 6. Further, the printer driver name 153 is the identification information such as the name of the printer driver corresponding to the individual printer 600.

By referring to the printer driver information 150, the delivery server 200 generates the printing data having the format corresponding to the printing-destination printer 600 from the printing data (intermediate printing data) having the format not depending on the printer 600, with use of the printer driver corresponding to the printing-destination printer 600.

(3-6: Authentication Information 160)

FIG. 9 is the diagram illustrating the authentication information 160 to be stored in the authentication server 300.

Here, the authentication information 160 is the information to be referred to when the user who intends to log in the printer 600 is authenticated. Further, a card number 161, a user name (user identification information) 162, a password 163 and a full name 164 are included in the authentication information 160.

Ordinarily, the user is authenticated by using the card number 161 and the user name (user identification information) 162 which are read from the non-contact IC card 700 by the card reader 319 of the printer 600. However, if the user does not have the non-contact IC card 700, the authentication may be performed by causing the user to input, in addition to the card number 161 and the user name (user identification information) 162, the password 163 to the operation unit 308.

(4: Operation of Printing Control System 1)

Subsequently, the operation of the printing control system 1 according to the first embodiment of the present invention will be described with reference to FIGS. 10, 11, 12, 13 and 14.

(4-1: Processes of Generating Printing Data Information 110 and Printing Job Information 120)

Figure 10:
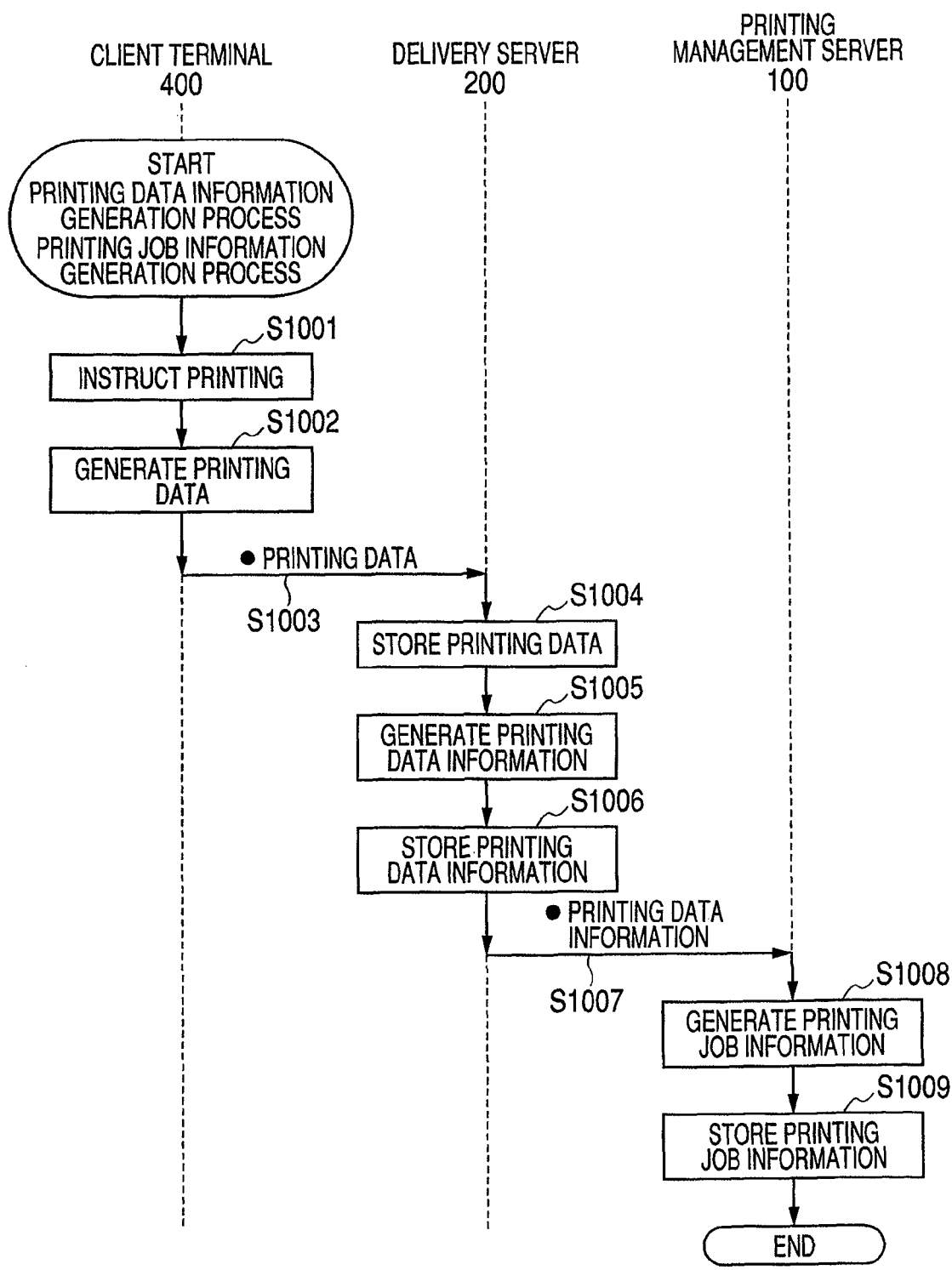
FIG. 10 is a flow chart indicating a process of generating the printing data information 110 and the printing job information 120 (in a case where printing data is transmitted from the client terminal 400).
Figure 11:
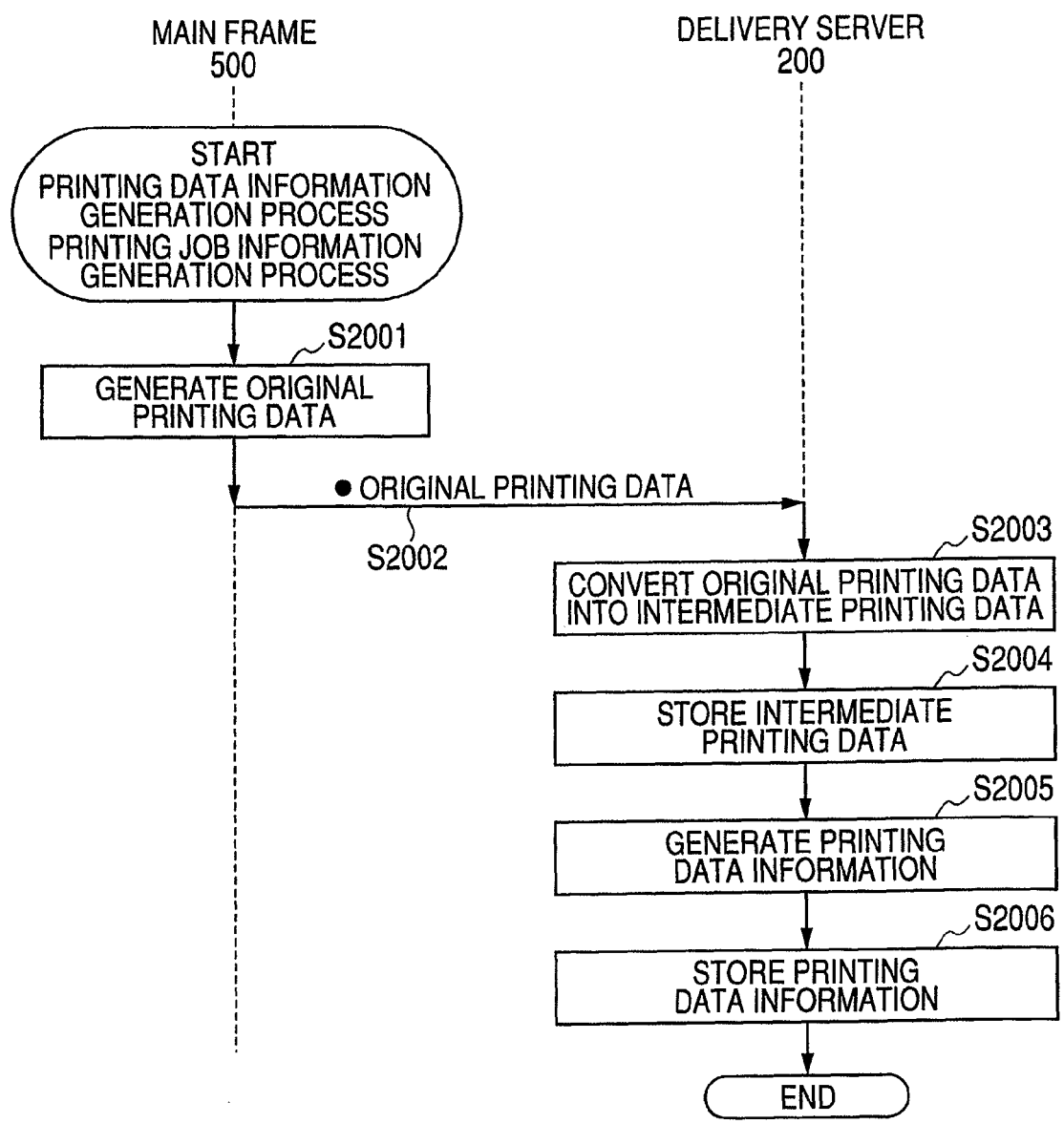
FIG. 11 is a flow chart indicating a process of generating the printing data information 110 and the printing job information 120 (in a case where printing data is transmitted from the main frame 500).

FIGS. 10 and 11 are the flow charts respectively indicating the processes of generating the printing data information 110 and the printing job information 120.

Here, it should be noted that the respective steps in the processes of the flow charts illustrated in FIGS. 10 and 11 are achieved if the respective CPUs 201 of the printing management server 100, the delivery server 200, the client terminal 400 and the main frame 500 perform on the RAMs 203 the execution programs stored respectively in the external memories 211.

FIG. 10 indicates a case where the printing data is transmitted from the client terminal 400.

(Step S1001) The user generates the printing data to be printed and then issues the printing instruction for the generated printing data, by using the application operating in the client terminal 400.

(Step S1002) In the client terminal 400, the printing data corresponding to the printing-destination printer 600 is generated by the printer driver, based on the data designated in the printing instruction.

(Step S1003) The printing data having the format depending on the printer 600 is transmitted from the client terminal 400 to the printing destination (port) set by the printer driver. The transmitted printing data is received by the delivery server 200. Incidentally, the bibliographic information such as the user name (user identification information) of the user who issued the printing instruction, the printer name (image forming apparatus identification information), the document name and the like is generated and added to the printing data having the format depending on the printer. Here, it should be noted that the user name (user identification information) is the user name (user identification information) at the time of login to the client terminal 400.

(Step S1004) In the delivery server 200, the printing data is stored in the external memory 211.

(Step S1005) In the delivery server 200, the user name (user identification information) 114, the printer name (image forming apparatus identification information) 113 and the document name 112 are acquired from the printing data. Then, the printing data information 110 is generated based on the acquired user name (user identification information) 114, the acquired printer name (image forming apparatus identification information) 113 and the acquired document name 112, in addition to the newly generated document ID (printing data identification information) 111. Incidentally, any information (for example, a time stamp) capable of uniquely identifying the printing data may be used as the document ID (printing data identification information) 111.

(Step S1006) In the delivery server 200, the printing data information 110 is stored in the external memory 211.

(Step S1007) The printing data information 110 is transmitted from the delivery server 200 to the printing management server 100. Thus, the transmitted printing data information 110 is received by the printing management server 100.

(Step S1008) In the printing management server 100, the printing job information 120 is generated based on the printing data information 110.

(Step S1009) In the printing management server 100, the printing job information 120 is stored in the external memory 211.

FIG. 11 indicates a case where the printing data is transmitted from the main frame 500.

(Step S2001) In the main frame 500, the original printing data is generated.

(Step S2002) The original printing data is periodically transmitted from the main frame 500 to the delivery server 200. Thus, the transmitted original printing data is received by the delivery server 200. Here, it should be noted that the original printing data does not have a data format capable of being printed by the printer 600 but has a text format such as a CSV (Comma Separated Value) format or the like.

(Step S2003) In the delivery server 200, the original printing data is converted into the printing data (intermediate printing data) which has a format overlaying a predetermined form and not depending on the printer 600.

(Step S2004) In the delivery server 200, the intermediate printing data is stored in the external memory 211.

(Step S2005) In the delivery server 200, the printing data information 110 is generated based on the intermediate printing data. More specifically, it is first determined in the delivery server 200 which user should perform the printing by which printer 600, and then the printing data information 110 is generated based on such a determined result. Incidentally, the delivery server 200 includes a table or the like for determining which user should print the printing data by which printer, and determining which printer should be used as a default printer if any printer is not designated.

(Step S2006) In the delivery server 200, the printing data information 110 is stored in the external memory 211.

Incidentally, in FIG. 10 or 11, the printing data information 110 is stored in the delivery server 200, and the printing job information 120 is stored in the printing management server 100. However, the present invention is not limited to this. That is, the printing data information 110 and the printing job information 120 may be unitarily managed as printing management information in the printing management server 100.

(4-2: Basic Operation of Printing Control System 1)

Figure 12:
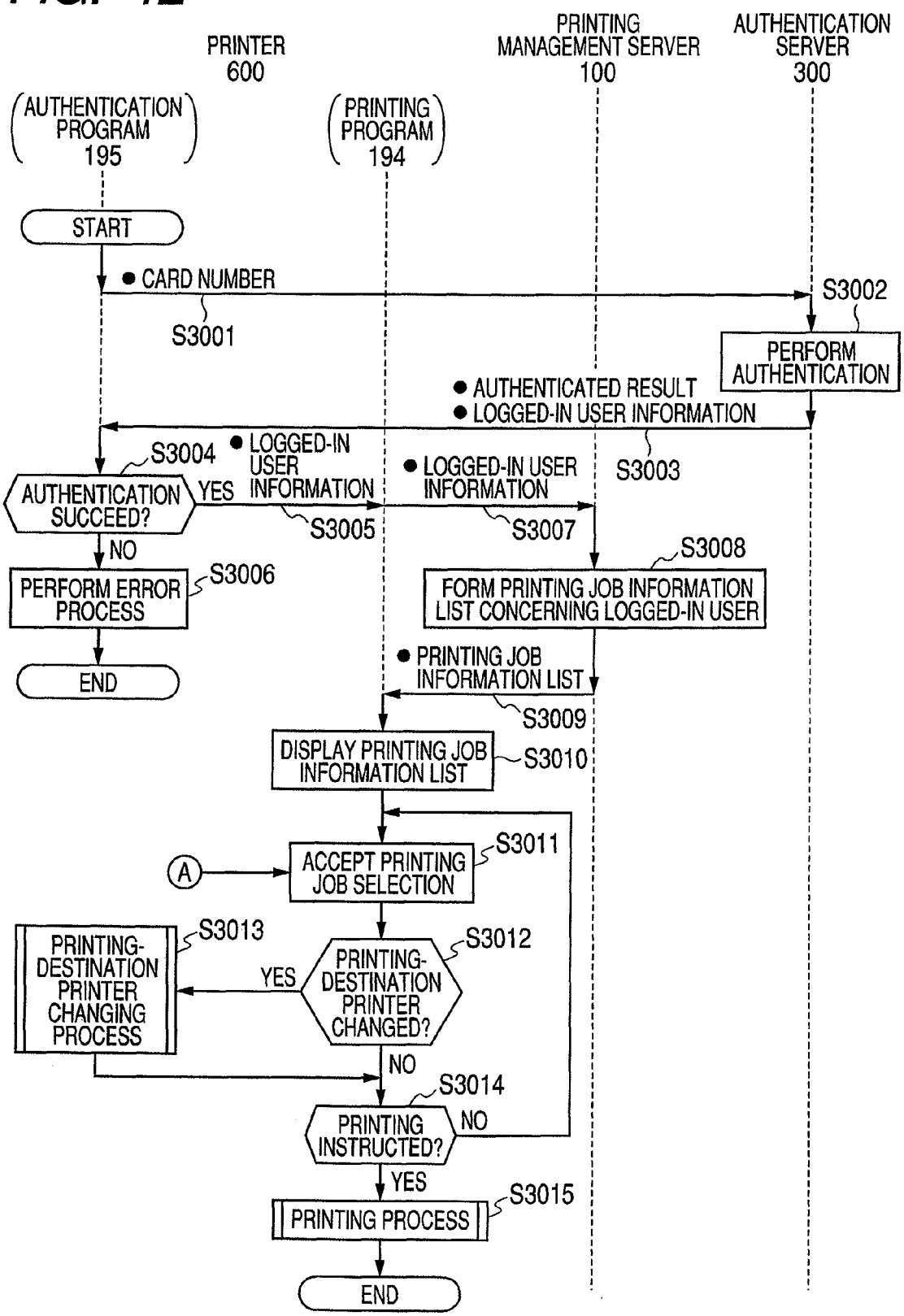
FIG. 12 is a flow chart indicating a basic operation of the printing control system 1.

FIG. 12 is the flow chart indicating the basic operation of the printing control system 1.

Here, it should be noted that the respective steps in the processes of the flow chart illustrated in FIG. 12 are achieved if the respective CPUs 201 of the printing management server 100, the delivery server 200 and the authentication server 300 perform on the RAMs 203 the execution programs 191, 192 and 193 respectively stored in the external memories 211, and if the CPU 301 of the printer 600 performs on the RAM 302 the authentication program 195 and the printing program 194 respectively stored in the HDD 304. In any case, it is assumed that the authentication program 195 and the printing program 194 operate independently.

(Step S3001) The card number read from the non-contact IC card 700 of the user is transmitted to the authentication server 300 by the authentication program 195 of the printer 600. Then, the transmitted card number is received by the authentication server 300.

(Step S3002) In the authentication server 300, the card number received from the printer 600 is compared with the card number 161 included in the authentication information 160, so as to authenticate the user.

(Step S3003) Then, the authenticated result is transmitted from the authentication server 300 to the printer 600, and the transmitted authenticated result is received by the authentication program 195 of the printer 600. More specifically, if it is authenticated by the authentication server 300 that the logged-in user is the legitimate user, authentication success information and the logged-in user information (user identification information) 140 are transmitted to the printer 600. On the other hand, if it is authenticated by the authentication server 300 that the logged-in user is not the legitimate user because the card number received from the printer 600 does not exist in the authentication information 160, authentication error information is transmitted to the printer 600.

(Step S3004) It is judged by the authentication program 195 of the printer 600 whether or not the authentication succeeded, based on the authenticated result received from the authentication server 300.

(Step S3005) If it is judged that the authentication succeeded, the logged-in user information 140 is notified to the printing program 194 by the authentication program 195 of the printer 600. Thus, the logged-in user information 140 is acquired by the printing program 194 of the printer 600.

(Step S3006) If it is judged by the authentication program 195 of the printer 600 that the authentication failed, an error process is performed. Then, it is displayed on the operation unit 308 that the login process failed, and the process in the printing control system 1 ends.

(Step S3007) The logged-in user information 140 is transmitted to the printing management server 100 by the printing program 194 of the printer 600 (user identification information transmission). Then, the transmitted logged-in user information 140 is received by the printing management server 100 (user identification information reception).

(Step S3008) In the printing management server 100, the printing job information list (printing data information list) concerning the logged-in users is formed from the printing job information 120, on the basis of the logged-in user information 140. More specifically, in the printing management server 100, the printing job information of the printing job for which the user name (user identification information) 142 of the logged-in user information 140 coincides with the user name (user identification information) of the printing job information 120 is acquired, and then the printing job information list (printing data information list) is formed based on the acquired printing job information.

Incidentally, if the printing job information 120 is not previously stored in the printing management server 100, the printing job information 120 may be generated by acquiring the printing data information 110 from the delivery server 200. Alternatively, the printing job information 120 may be acquired by requesting generation itself of the printing job information 120 to the delivery server 200.

Further, the document ID (printing data identification information) 121, the document name 122, the printer name (image forming apparatus identification information) 126 and the printing data classification 128 are included, for each printing job, in the printing job information list (printing data information list).

(Step S3009) The printing job information list (printing data information list) concerning the logged-in user is transmitted from the printing management server 100 to the printer 600 (printing data information list transmission). Then, the printing job information list (printing data information list) concerning the logged-in user is received by the printing program 194 of the printer 600 (printing data list reception). Incidentally, all the items in the printing job information 120 may be transmitted and received. Alternatively, only the necessary item in the printing job information 120 may be transmitted and received. Further, the received printing job information list (printing data information list) is stored in the RAM 302. Incidentally, it should be noted that also the printing job which cannot be output by the printer 600 which received the printing job information list (printing data information list) is included in the relevant printing job information list (printing data information list).

Figure 20:
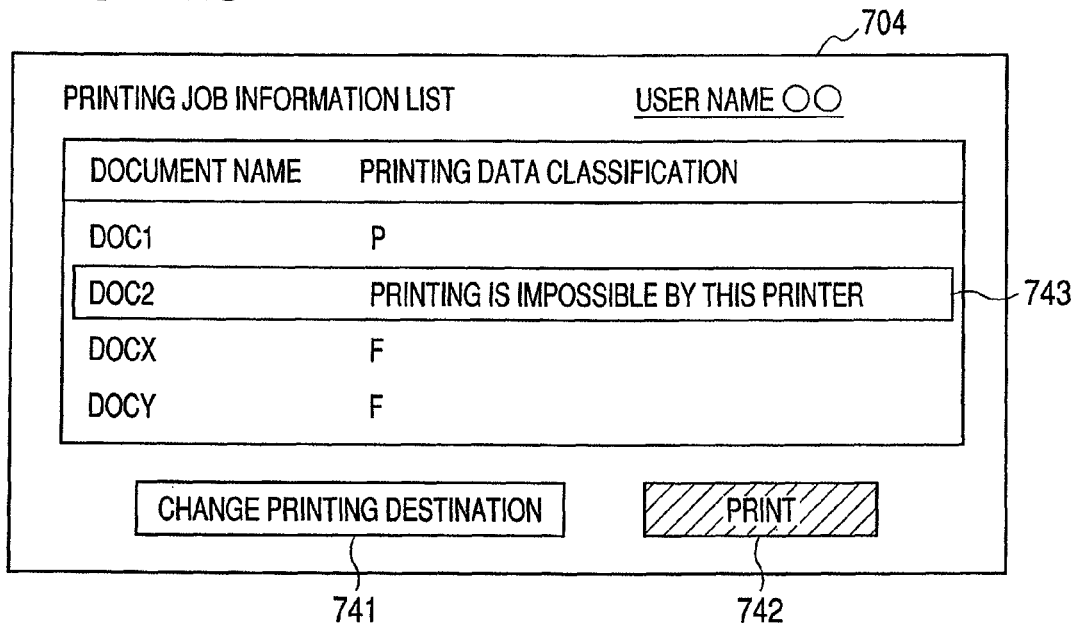
FIG. 20 is a diagram illustrating a printing job information list (printing data information list) 704.

(Step S3010) Under the control of the printing program 194 of the printer 600, the printing job information list (printing data information list) received from the printing management server 100 is displayed on the screen 330 of the operation unit 308 (FIG. 20). Here, in the case where the printing job information list (printing data information list) is displayed, if the printer name (image forming apparatus identification information) included in the printing job information list (printing data information list) does not coincide with the printer name (image forming apparatus identification information) stored in the printer 600 which received the printing job information list (printing data information list) and the printing data classification indicating "P" (printer description language) is included in the printing job information, a message "PRINTING IS IMPOSSIBLE BY THIS PRINTER" as indicated by the printing job information 743 illustrated in FIG. 20 is displayed.

Incidentally, it may be judged by the printing management server 100 whether or not the relevant data is the data printable by the printer 600. In this case, the information enabling to judge whether the printing is possible or impossible is added to each printing job information in the printing job information list (printing data information list).

Incidentally, displaying of the printing job information list (printing data information list) on the screen 330 of the operation unit 308 will be described later with reference to FIGS. 17, 18, 19 and 20.

(Step S3011) Under the control of the printing program 194 of the printer 600, an input from the user concerning the selection of the printing job information is received and accepted in the printing job information list (printing data information list) (FIG. 17) displayed on the screen 330 of the operation unit 308 (printing data selection). Then, the selected printing job information to which a flag or the like indicating that the relevant printing job information has been selected is input to the printing job information list (printing data information list) stored in the RAM 302, so as to be able to identify which printing job information in the printing job information list (printing data information list) is being selected.

Figure 18:
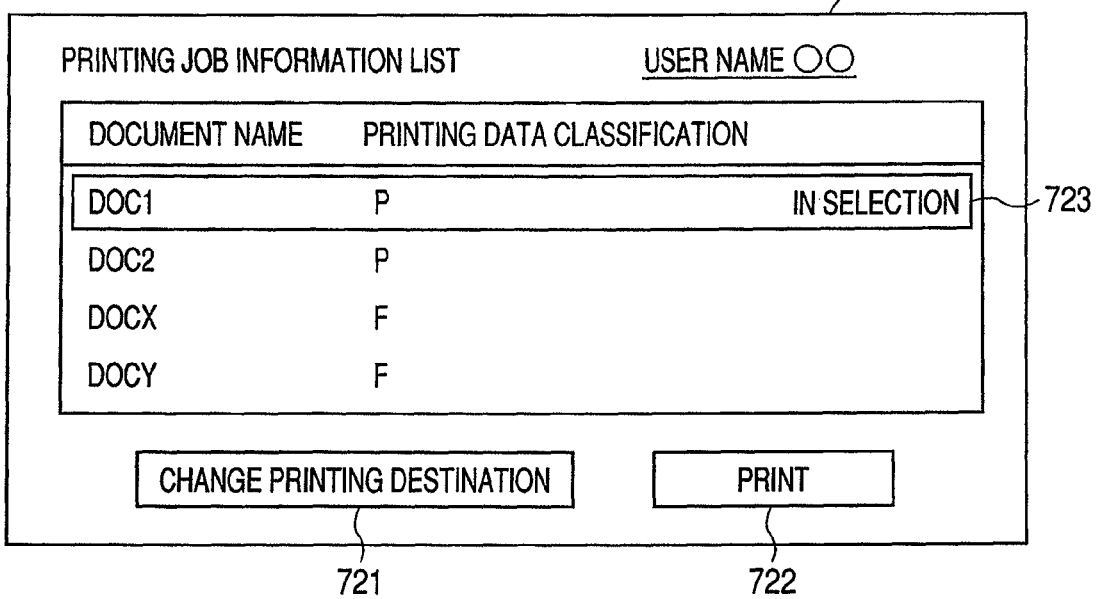
FIG. 18 is a diagram illustrating a printing job information list (printing data information list) 702.

(Step S3012) Then, under the control of the printing program 194 of the printer 600, it is judged whether or not a printing-destination printer changing instruction is input from the user to change the printing destination of the printing job in the state that the relevant printing job is being selected in the printing job information list (printing data information list) displayed on the screen 330 of the operation unit 308. More specifically, it is judged that a printing destination changing button 721 illustrated in FIG. 18 is depressed. If it is judged that the printing-destination printer changing instruction is input from the user, the flow advances to a printing-destination printer changing process in a step S3013. On the other hand, if it is judged that the printing-destination printer changing instruction is not input, the flow advances to a step S3014. Incidentally, the printing-destination printer changing process in the step S3013 will be described later with reference to FIG. 13.

(Step S3014) Under the control of the printing program 194 of the printer 600, it is judged whether or not a printing instruction of the printing data concerning the printing job information selected in the printing job information list (printing data information list) displayed on the screen 330 of the operation unit 308 is input from the user. If it is judged that the printing instruction is input from the user, the flow advances to a step S3015 to perform a printing process. On the other hand, if it is judged that the printing instruction is not input, the flow returns to the step S3011 to wait for a next instruction. Incidentally, the printing process in the step S3015 will be described later with reference to FIG. 14.

(4-3: Detail of Printing-Destination Printer Changing Process)

Figure 13:
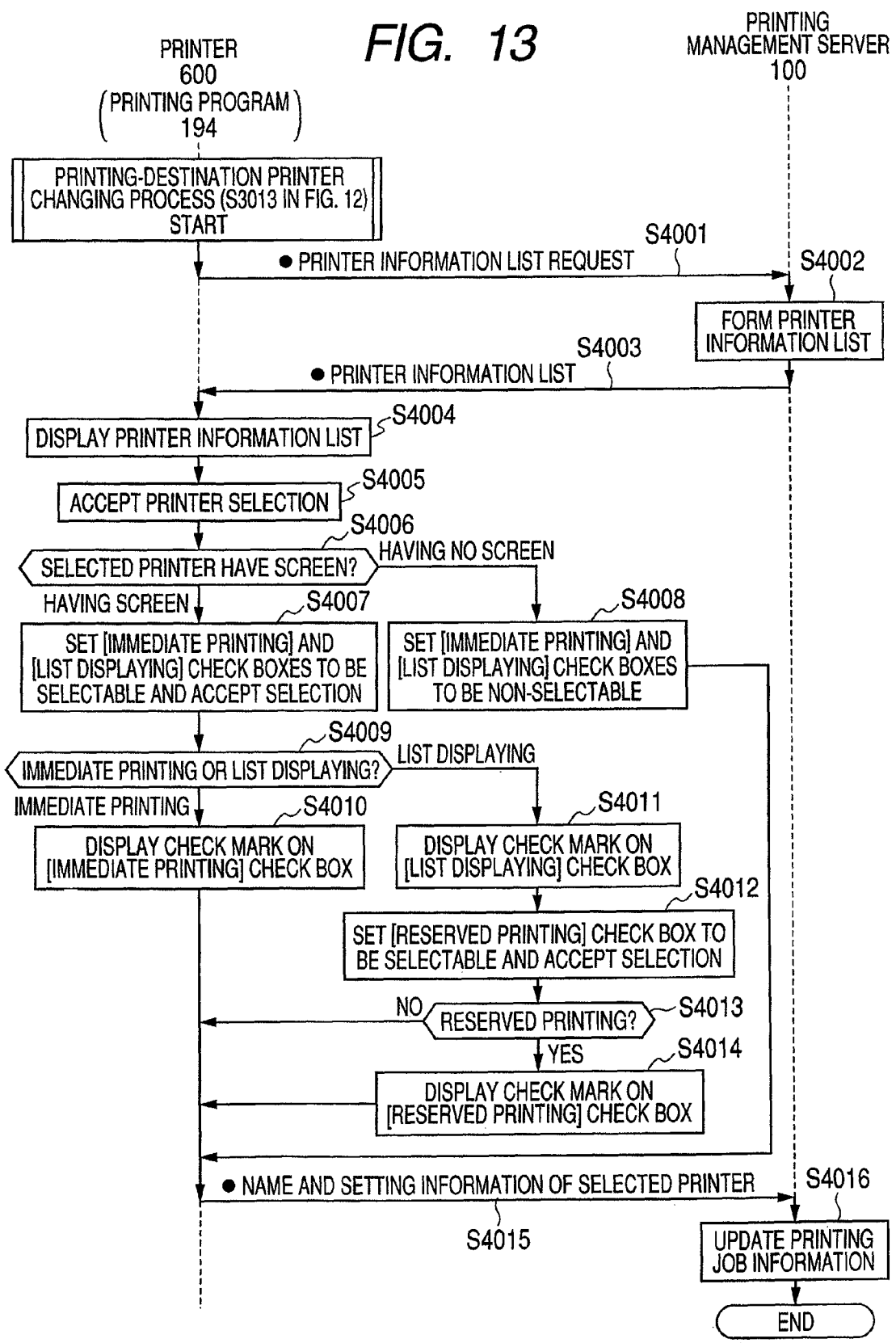
FIG. 13 is a flow chart indicating the detail of a printing-destination printer changing process (step S3013 in FIG. 12).

FIG. 13 is the flow chart indicating the detail of the printing-destination printer changing process (the step S3013 in FIG. 12).

Here, it should be noted that the respective steps in the process of the flow chart illustrated in FIG. 13 are achieved if the CPU 201 of the printing management server 100 performs the execution program 191 stored in the external memory 211 on the RAM 203, and if the CPU 301 of the printer 600 performs the printing program 194 stored in the HDD 304 on the RAM 302.

(Step S4001) Under the control of the printing program 194 of the printer 600, a printer information list request is transmitted from the printer 600 to the printing management server 100. Then, the transmitted printer information list request is received by the printing management server 100.

(Step S4002) In the printing management server 100, the printer information list is formed based on the printer information 130.

Incidentally, the printer information list may be formed for all the items in the printer information 130. Alternatively, the printer information list may be formed for only the necessary item in the printer information 130. Further, if the printer information 130 is not previously stored in the printing management server 100, the printer information 130 may be acquired from the delivery server 200.

(Step S4003) The printer information list is transmitted from the printing management server 100 to the printer 600. Then, the transmitted printer information list is received by the printing program 1944 of the printer 600.

(Step S4004) Under the control of the printing program 194 of the printer 600, the printer information list received from the printing management server 100 is displayed on the screen 330 of the operation unit 308. Incidentally, displaying of the printer information list on the screen 330 of the operation unit 308 will be described later with reference to FIGS. 21, 22 and 23.

(Step S4005) Under the control of the printing program 194 of the printer 600, an input concerning the selection of the printer 600 is received and accepted from the user in the printer information list displayed on the screen 330 of the operation unit 308 (image forming apparatus selection).

(Step S4006) Then, under the control of the printing program 194 of the printer 600, it is judged by referring to the item concerning "screen/no screen" included in the printer information list whether or not the printer 600 selected by the user is the screen printer 600-1 or the non-screen printer 600-2.

(Step S4007) Under the control of the printing program 194 of the printer 600, if it is judged that the printer 600 selected by the user is the screen printer 600-1, the check boxes (radio buttons) of "IMMEDIATE PRINTING" and "LIST DISPLAYING" are made selectable in the printer information list displayed on the screen 330 of the operation unit 308, and the input concerning the selection by the user is accepted. Incidentally, either one of the check boxes "IMMEDIATE PRINTING" and "LIST DISPLAYING" may be selectable as a default value.

After then, the flow advances to a step S4009.

(Step S4008) Under the control of the printing program 194 of the printer 600, if it is judged that the printer 600 selected by the user is the non-screen printer 600-2, the check boxes (radio buttons) of "IMMEDIATE PRINTING" and "LIST DISPLAYING" are made unselectable in the printer information list displayed on the screen 330 of the operation unit 308 (FIG. 23). Incidentally, the check box "IMMEDIATE PRINTING" may be selectable.

After then, the flow advances to a step S4015.

(Step S4009) Under the control of the printing program 194 of the printer 600, it is judged which of the check boxes "IMMEDIATE PRINTING" and "LIST DISPLAYING" is selected.

Figure 21:
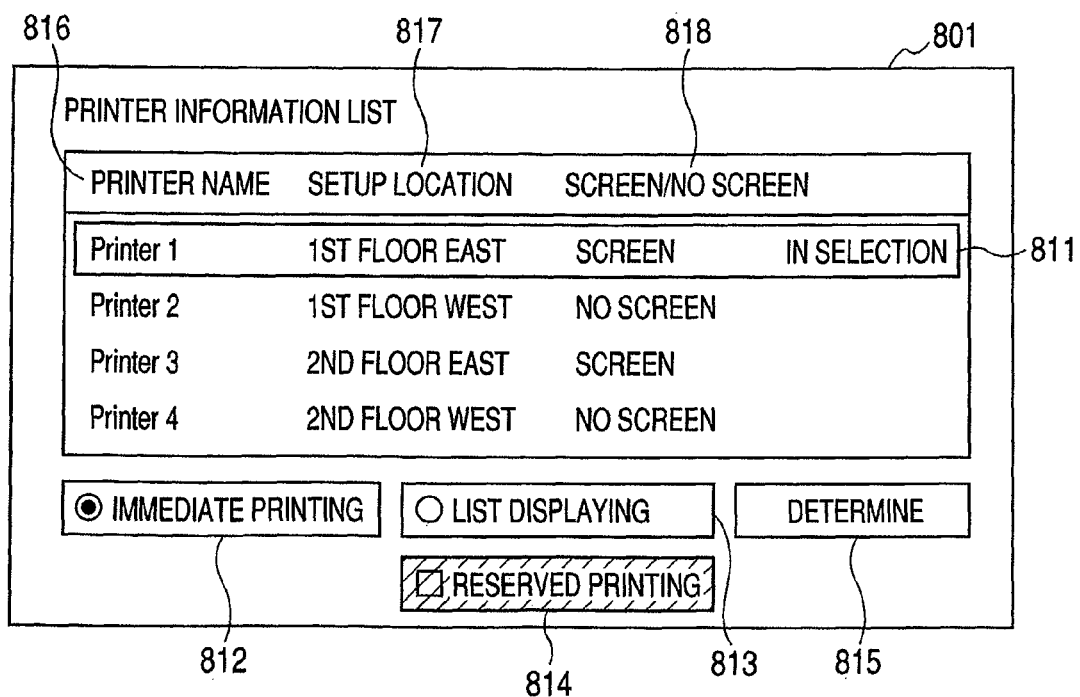
FIG. 21 is a diagram illustrating a printer information list 801.

(Step S4010) Under the control of the printing program 194 of the printer 600, if it is judged in the step S4009 that the check box "IMMEDIATE PRINTING" is selected, a check mark is displayed in the check box "IMMEDIATE PRINTING" (FIG. 21).

After then, the flow advances to the step S4015.

(Step S4011) Under the control of the printing program 194 of the printer 600, if it is judged in the step S4009 that the check box "LIST DISPLAYING" is selected, a check mark is displayed in the check box "LIST DISPLAYING" (FIG. 22).

(Step S4012) Under the control of the printing program 194 of the printer 600, the check box of "RESERVED PRINTING" is made selectable in the printer information list displayed on the screen 330 of the operation unit 308, and the input concerning the selection by the user is accepted.

(Step S4013) Under the control of the printing program 194 of the printer 600, it is judged whether or not the check box "RESERVED PRINTING" is selected. Then, under the control of the printing program 194 of the printer 600, if it is judged in the step S4013 that the check box "RESERVED PRINTING" is not selected, the flow directly advances to the step S4015.

(Step S4014) Under the control of the printing program 194 of the printer 600, if it is judged in the step S4013 that the check box "RESERVED PRINTING" is selected, a check mark is displayed in the check box "RESERVED PRINTING".

After then, the flow advances to the step S4015.

(Step S4015) Under the control of the printing program 194 of the printer 600, if the user ends the selection of the printing-destination printer and the setting concerning "IMMEDIATE PRINTING" and "RESERVED PRINTING", the document ID (printing data identification information) of the printing job selected in the step S3011 is acquired from the printing job information list (printing data information list) stored in the RAM 302, and then output setting information composed of the acquired document ID (printing data identification information), the printer name (image forming apparatus identification information) of the selected printer 600 and the setting information (immediate printing information or reserved printing information) is transmitted to the printing management server 100 (image forming apparatus information transmission). Subsequently, the transmitted output setting information is received by the printing management server 100 (image forming apparatus information reception).

(Step S4016) In the printing management server 100, the printing job information 120 is updated based on the document ID (printing data identification information), the printer name (image forming apparatus identification information) and the setting information (immediate printing information or reserved printing information) included in the output setting information received from the printer 600. More specifically, the items of the printer name (image forming apparatus identification information) 126, the immediate printing flag 124 and the reserved printing flag 125 of the printing job information 120 are updated (image forming apparatus information change, setting information update)

(4-4: Detail of Printing Process)

Figure 14:
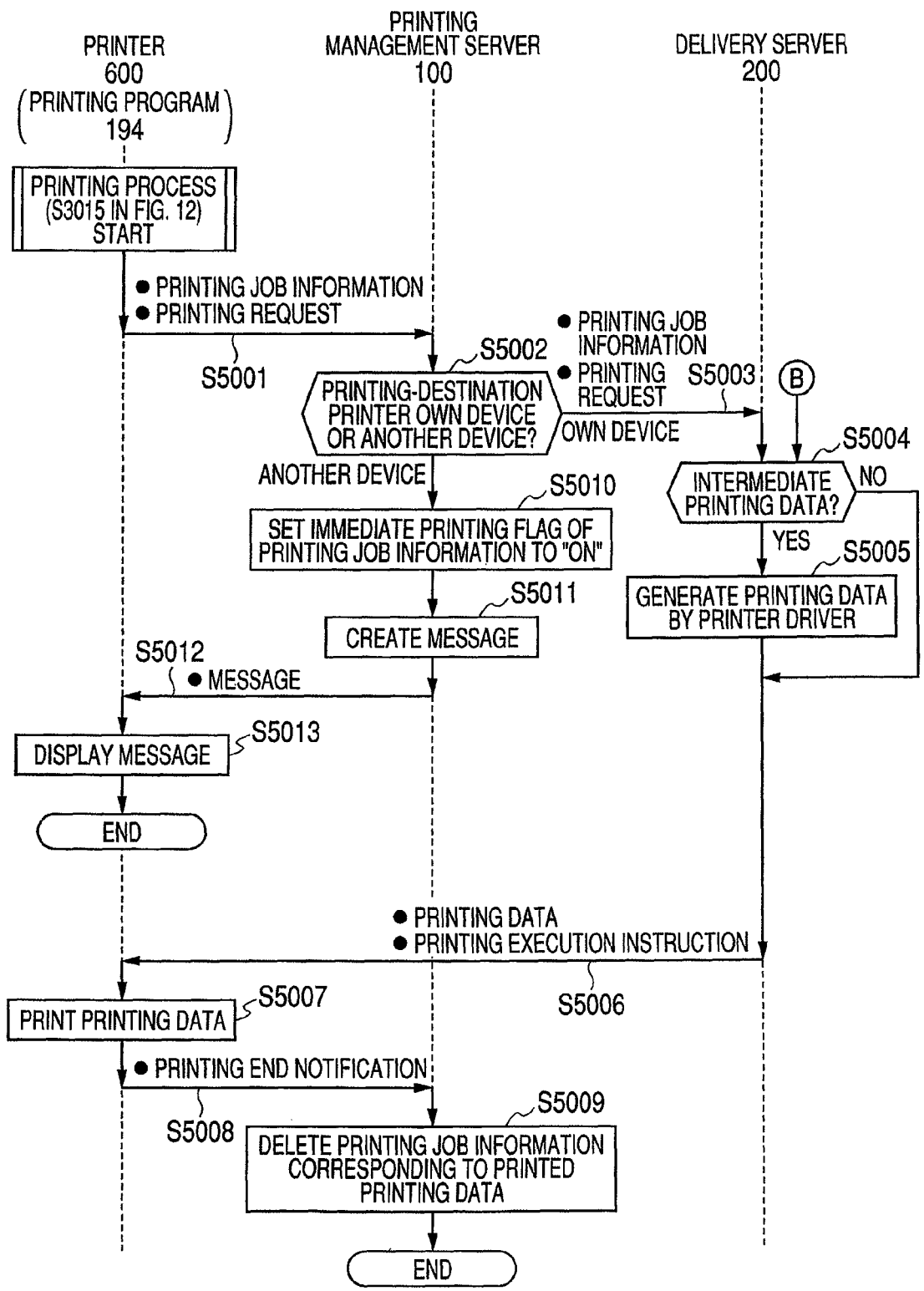
FIG. 14 is a flow chart indicating the detail of a printing process (step S3015 in FIG. 12).

FIG. 14 is the flow chart indicating the detail of the printing process (step S3015 in FIG. 12).

Here, it should be noted that the respective steps in the process of the flow chart illustrated in FIG. 14 are achieved if the respective CPUs 201 of the printing management server 100 and the delivery server 200 perform on the RAMs 203 the execution program 191 and the execution program 192 respectively stored in the external memories 211, and if the CPU 301 of the printer 600 performs on the RAM 302 the printing program 194 stored in the HDD 304.

(Step S5001) Under the control of the printing program 194 of the printer 600, the printing job information selected and print-instructed by the user in the printing job information list (printing data information list) displayed on the screen 330 of the operation unit 308 and a printing request are transmitted to the printing management server 100 (selected printing data information transmission). Then, the printing job information selected and print-instructed by the user and the printing request are received by the printing management server 100 (selected printing data information reception). Incidentally, the document ID (printing data identification information) is included in the printing job information, and the printing request is generated by the printer 600 so as to print the printing data corresponding to the relevant document ID (printing data identification information). Here, the IP address of the printer 600 may be included in the printing request. However, since the IP address can be acquired by the printing management server 100 via the TCP/IP communication, the IP address may not be included in the printing request.

(Step S5002) In the printing management server 100, the item of the printer name (image forming apparatus identification information) of the printing-destination printer by which the printing job is actually printed is referred to in the printing job information (document ID (printing data identification information)) received from the printer 600, and it is judged based on the referred item whether the printing-destination printer 600 is own device (that is, the printer 600 of the login source) or another device. If it is judged that the printing-destination printer 600 is the own apparatus, the flow advances to a step S5003. On the other hand, if it is judged that the printing-destination printer 600 is another apparatus, the flow advances to a step S5010.

(Step S5003) The printing job information selected and print-instructed by the user and the printing request are transmitted from the printing management server 100 to the delivery server 200. Then, the printing job information selected and print-instructed by the user and the printing request are received by the delivery server 200.

(Step S5004) In the delivery server 200, the item of the printing data classification of the printing job to be printed is referred to in the printing job information (document ID (printing data identification information)) received from the printing management server 100 in the step S5003, and it is judged based on the referred item whether the printing-target printing data is the printing data generated by the printer driver (that is, the printing data having the format depending on the image forming apparatus) or the intermediate printing data acquired previous to the process by the printer driver (that is, the printing data having the format not depending on the image forming apparatus). Then, if it is judged that the printing-target printing data is the intermediate printing data acquired previous to the process by the printer driver, the flow advances to a step S5005. On the other hand, if it is judged that the printing-target printing data is the printing data generated by the printer driver, the flow advances to a step S5006.

(Step S5005) In the delivery server 200, the printer driver corresponding to the printer 600 is determined by referring to the printer driver information 150. Then, the printing data corresponding to the printer 600 is generated from the intermediate printing data by using the determined printer driver.

(Step S5006) In the delivery server 200, since the printing data classification indicates, for example, "P" (that is, the printing data has already been converted into the printing data having a printer description language format), the printing-target printing data and a printing execution instruction are transmitted to the printer 600 (first output). Then, the printing-target printing data and the printing execution instruction are received by the printing program 194 of the printer 600.

(Step S5007) Under the control of the printing program 194 of the printer 600, the printing of the printing data is performed.

(Step S5008) Under the control of the printing program 194 of the printer 600, a printing end notification is transmitted to the printing management server 100. Then, the printing end notification is received by the printing management server 100.

(Step S5009) In the printing management server 100, the printing job information to which the printing ended (that is, the printing job information corresponding to the printed printing data) is deleted from the printing job information 120.

(Step S5010) In the printing management server 100, the immediate printing flag 124 of the printing-target printing data is set to "ON" in the printing job information 120 of the printing job to be printed, from the received printing job information (document ID (printing data identification information)). This is because, since the printing job is explicitly selected and print-instructed by the user, the process same as the process of depressing an immediate printing button (check box) 812 illustrated in FIG. 21 is performed.

(Step S5011) In the printing management server 100, a message (for example, "printing is performed by another printer ooo") is created.

(Step S5012) The created message is transmitted from the printing management server 100 to the printer 600. Then, the transmitted message is received by the printing program 194 of the printer 600.

(Step S5013) Under the control of the printing program 194 of the printer 600, the message received form the printing management server 100 is displayed on the operation unit 308.

(5: Display Screen on Printer 600)

Subsequently, the display screen on the printer 600 will be described with reference to FIGS. 17, 18, 19, 20, 21, 22 and 23.

(5-1: Printing Job Information List (Printing Data Information List))

FIGS. 17, 18, 19 and 20 are the diagrams respectively illustrating printing job information lists (printing data information lists) 701, 702, 703 and 704 to be displayed on the screen 330 of the operation unit 308. Here, it should be noted that the printing job information lists (printing data information lists) 701, 702, 703 and 704 are displayed based on the printing job information lists (printing data information lists) received from the printing management server 100.

Figure 17:
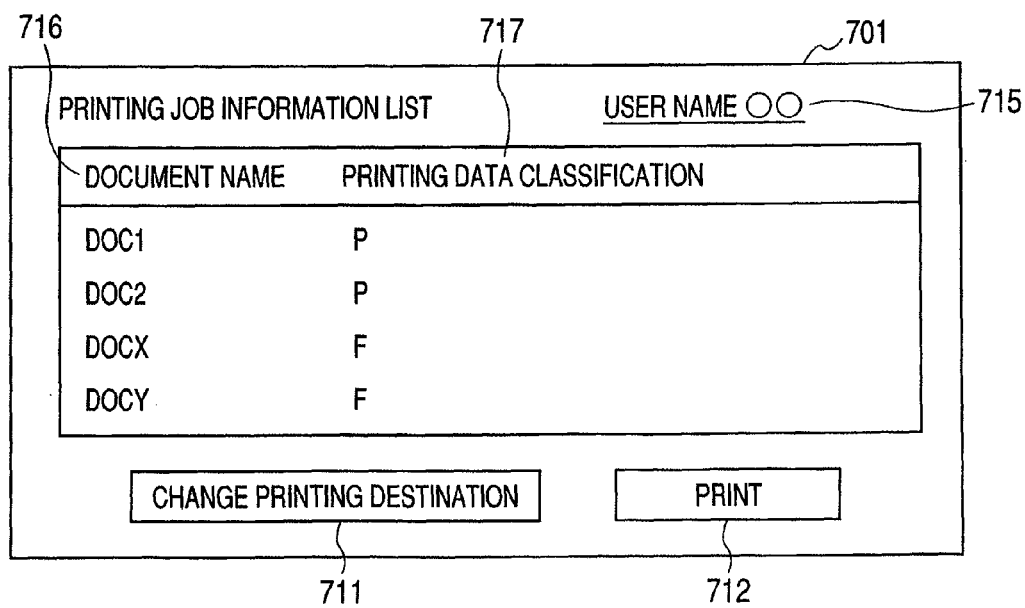
FIG. 17 is a diagram illustrating a printing job information list (printing data information list) 701.

In the process of the step S3010 illustrated in FIG. 12 and the process of a later-described step S6009 illustrated in FIG. 15, a user name (user identification information) 715, a document name 716, a printing data classification 717 and the like are displayed as the printing job information concerning the logged-in user in the printing job information list (printing data information list) 701 illustrated in FIG. 17. Further, a printing destination changing button 711 and a printing button 712 are displayed in the printing job information list (printing data information list) 701. Incidentally, the printing data classification 717 is displayed as "P" in case of the printing data generated by the printer driver and converted to have the printer description language format. On the other hand, the printing data classification 717 is displayed as "F" in case of the intermediate printing data.

On the premise that the printing job information was selected from the printing job information list (printing data information list) 701, if the printing destination changing button 711 is depressed and thus designated, the process shifts to the printing-destination printer changing process illustrated in FIG. 13. On the other hand, on the premise that the printing job information was selected from the printing job information list (printing data information list) 701, if the printing button 712 is depressed and thus designated, the process shifts to the printing process illustrated in FIG. 14.

In the process of the step S3011 illustrated in FIG. 12, the printing job information is selected if it is touched by the user in the printing job information list (printing data information list) 701 displayed on the screen 330 of the operation unit 308. Further, selected printing job information 723 is discriminably displayed in the printing job information list (printing data information list) 702 illustrated in FIG. 18, selected printing job information 733 is discriminably displayed in the printing job information list (printing data information list) 703 illustrated in FIG. 19, and selected printing job information 743 is discriminably displayed in the printing job information list (printing data information list) 704 illustrated in FIG. 20. Incidentally, as in a process of a later-described step S6011 illustrated in FIG. 15, the printing job information to which the reserved printing flag is "ON" is set to be in a selected state.

Figure 19:
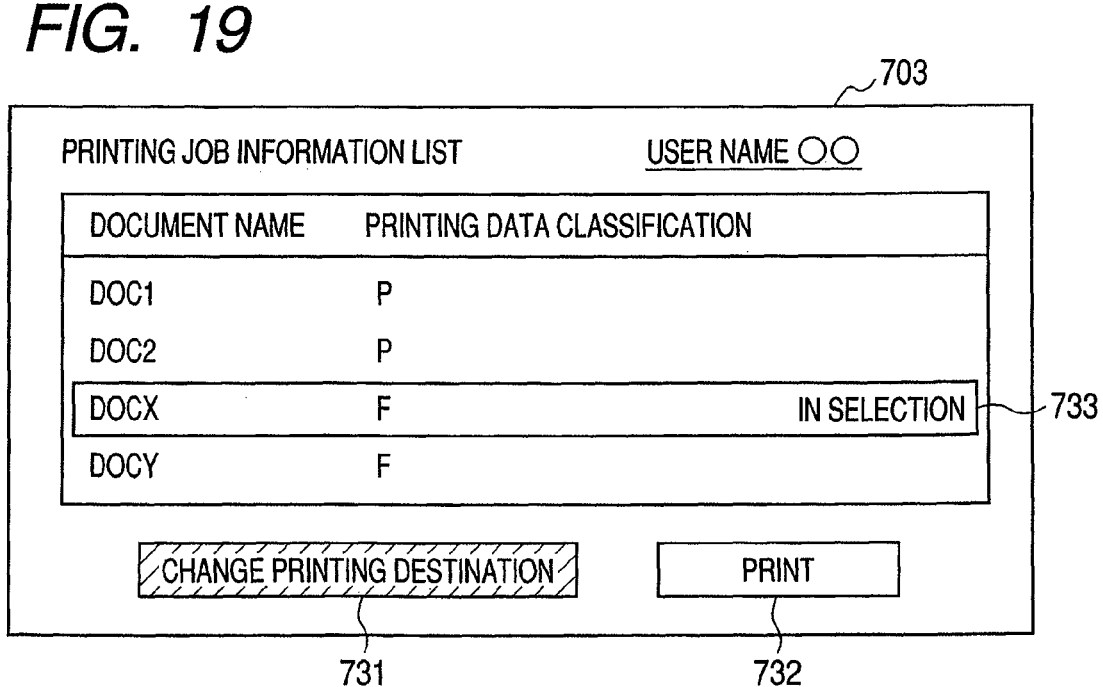
FIG. 19 is a diagram illustrating a printing job information list (printing data information list) 703.

In a case where the printing job information selected by the user is printable by the printer 600 that the user logged in, printing buttons such as a printing button 722 illustrated in FIG. 18 and a printing button 732 illustrated in FIG. 19 are displayed so as to be able to be designated. Here, it should be noted that the case where the printing job information selected by the user is printable by the printer 600 that the user logged in is equivalent to a case where the format of the printing data corresponds to the printer 600 that the user logged in, or to a case where the printing data can be converted by the printer driver to have the format corresponding to the printer 600 that the user logged in.

In a case where the printing job information selected by the user is not printable by the printer 600 that the user logged in, the printing button is displayed so as not to be able to be designated, as in a printing button 742 illustrated in FIG. 20 (for example, shadow display).

Further, in a case where the printing job information selected by the user is printable by the printer 600 other than the printer 600 that the user logged in, the printing destination changing buttons such as the printing destination changing button 721 illustrated in FIG. 18 and a printing destination changing button 741 illustrated in FIG. 20 are displayed to be able to be designated.

On the other hand, in a case where the printing job information selected by the user is not printable by the printer 600 other than the printer 600 that the user logged in, the printing destination changing button such as a printing destination changing button 731 illustrated in FIG. 19 is displayed not to be able to be designated (for example, shadow display).

(5-2: Printer Information List)

FIGS. 21, 22 and 23 are the diagrams respectively illustrating printer information lists 801, 802 and 803 displayed on the screen 330 of the operation unit 308 provided on the screen printer 600-1. Here, it should be noted that these lists are displayed based on the printer information list received from the printing management server 100 (image forming apparatus selection).

In the process of the step S4004 illustrated in FIG. 13, a printer name (image forming apparatus identification information) 816, a setup location 817, and a screen/no screen 818 are displayed in the printer information list 801 illustrated in FIG. 21. Further, the immediate printing check box 812, a list displaying check box 813, a reserved printing check box 814 and a determination button 815 are displayed in the printer information list 801.

On the premise that the printer information was selected from the printer information list 801, if the immediate printing check box 812, the list displaying check box 813 and the reserved printing check box 814 are touched for designation, the printer name (image forming apparatus identification information) and the setting information of the selected printer 600 are transmitted to the printing management server 100, and thus the printing job information 120 stored in the printing management server 100 is updated.

In the process of the step S4005 illustrated in FIG. 13, the printer information is selected if it is touched by the user in the printer information list 801 displayed on the screen 330 of the operation unit 308. Further, selected printer information 811 is discriminably displayed in the printer information list 801 illustrated in FIG. 21, selected printer information 821 is discriminably displayed in the printer information list 802 illustrated in FIG. 22, and selected printer information 831 is discriminably displayed in the printer information list 803 illustrated in FIG. 23.

In the process of the step S4007 illustrated in FIG. 13, if the printer information selected by the user indicates the screen printer 600-1, the immediate printing check box 812 and the list displaying check box 813 are displayed to be able to be designated, as illustrated in the printer information list 801 of FIG. 21.

In the process of the step S4008 illustrated in FIG. 13, if the printer information selected by the user indicates the non-screen printer 600-2, an immediate printing check box 832, a list displaying check box 833 and a reserved printing check box 834 are displayed not to be able to be designated, as illustrated in the printer information list 803 of FIG. 23.

In the process of the step S4010 illustrated in FIG. 13, if the immediate printing check box 812 is touched and thus designated, the immediate printing check box 812 is displayed with a check mark, as illustrated in the printer information list 801 of FIG. 21. In this case, the reserved printing check box 814 is displayed not to be able to be designated (for example, shadow display).

In the processes of the steps S4011 to S4014 illustrated in FIG. 13, if a list displaying check box 823 is touched and thus designated, the list displaying check box 823 is displayed with a check mark, as illustrated in the printer information list 802 of FIG. 22. Further, a reserved printing check box 824 is displayed to be able to be designated. Then, the reserved printing check box 824 is touched and thus designated, the reserved printing check box 824 is displayed with a check mark.

(6: Main Effect)

As just described, in the printing control system according to the first embodiment, the whole of the printing job information concerning the logged-in users is displayed on the printer of the login source. Thus, with respect to the printing job information which cannot be printed by the printer of the login source or can be printed by another printer, the printer of the login source can change the printing-destination printer and then issue the printing instruction. Further, in the case where the printing-destination printer is changed, also the immediate printing and the reserved printing can be designated. Furthermore, in addition to the printing data having the format depending on the printer, the printing data having the format not depending on the printer can be printed via the printer driver.

<Second Embodiment>

(7: Printing Control System in a Case where Screen Printer 600-1 and Non-Screen Printer 600-2 Mixedly Exist)

Subsequently, the second embodiment of the present invention will be described with reference to FIGS. 15 and 16.

In the first embodiment, it is assumed that the printer 600 of the login source is the screen printer 600-1. On the other hand, in the second embodiment, the printing control system in which the screen printer 600-1 and the non-screen printer 600-2 mixedly exist is configured.

(7-1: in a Case where Printer 600 of Login Source is Screen Printer 600-1)

Figure 15:
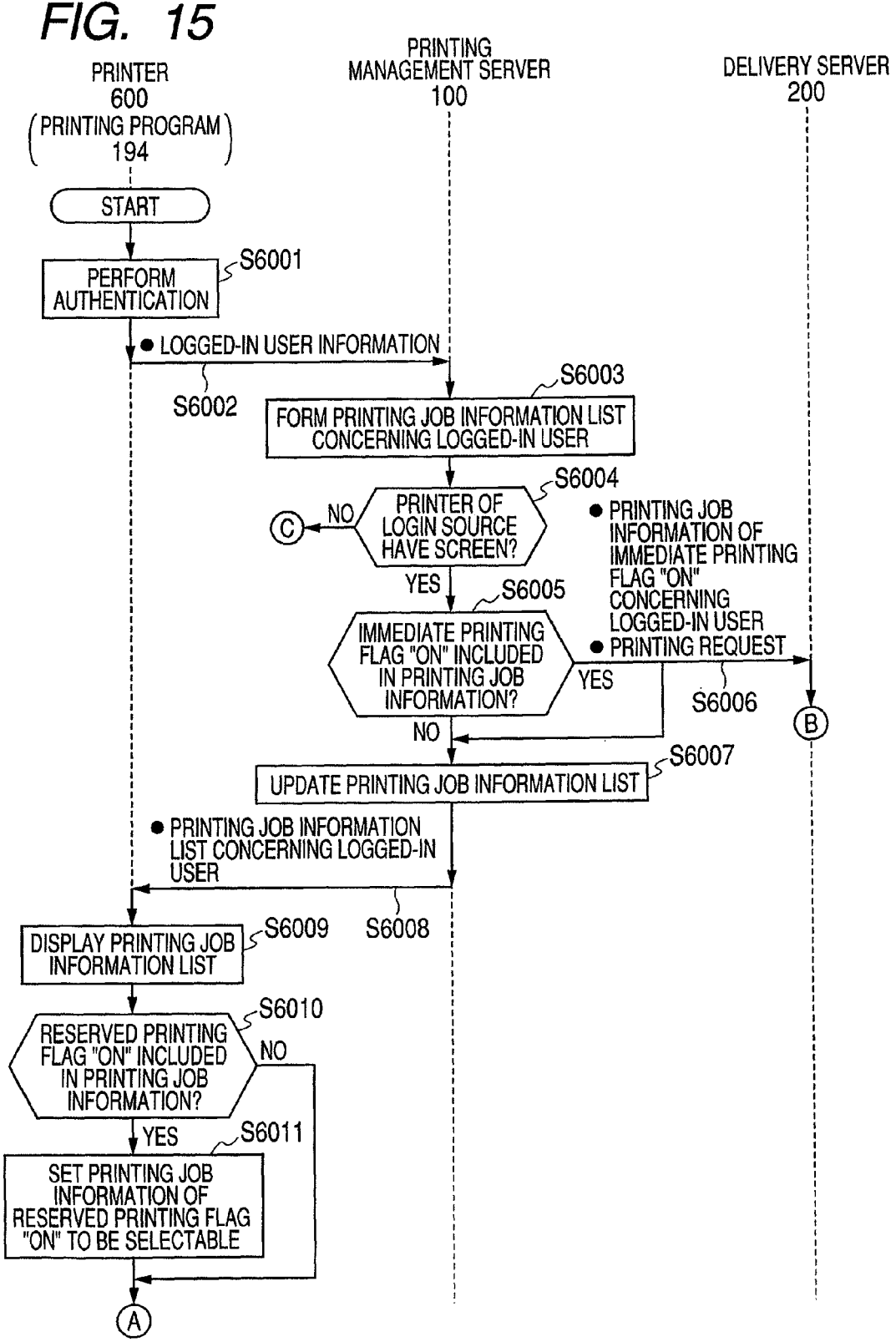
FIG. 15 is a flow chart indicating an operation of the printing control system 1 in a case where the printer 600 of a login source is a printer 600-1 having a screen.

FIG. 15 is the flow chart indicating an operation of the printing control system 1 in a case where the printer 600 of the login source is the screen printer 600-1.

Here, it should be noted that the respective steps in the process of the flow chart illustrated in FIG. 15 are achieved if the respective CPUs 201 of the printing management server 100 and the delivery server 200 perform on the RAMs 203 the execution program 191 and the execution program 192 respectively stored in the external memories 211, and if the CPU 301 of the printer 600 performs on the RAM 302 the printing program 194 stored in the HDD 304.

(Steps S6001, S6002 and S6003) It should be noted that the processes in the steps S6001 to S6003 of FIG. 15 are the same as those in the steps S3001 to S3008 of FIG. 12, respectively.

(Step S6004) It is judged by the printing management server 100 whether the printer 600 of the login source is the screen printer 600-1 or the non-screen printer 600-2. More specifically, the printer information 130 is referred to by the printing management server 100. Consequently, the printer 600 of the login source is identified and it is judged whether or not the screen 330 is provided on the operation unit 308, on the basis of the IP address acquired via the communication (TCP/IP communication) in the case where the logged-in user information 140 was received in the process of step S6002. Subsequently, if it is judged that the printer 600 of the login source is the screen printer 600-1, the flow advances to a step S6005. On the other hand, if it is judged that the printer 600 of the login source is the non-screen printer 600-2, the flow advances to a step S6012 illustrated in FIG. 16.

(Step S6005) It is judged by the printing management server 100 whether or not the printing job information indicating that the immediate printing flag is "ON" exists in the printing job information list (printing data information list) concerning the logged-in user generated in the process of the step S6003. Then, if it is judged that the printing job information indicating that the immediate printing flag is "ON" exists in the printing job information list (printing data information list), the flow advances to a step S6006. On the other hand, if it is judged that the printing job information indicating that the immediate printing flag is "ON" does not exist in the printing job information list (printing data information list), the flow advances to a step S6007.

(Step S6006) The printing job information which indicates that the immediate printing flag concerning the logged-in user is "ON" and the printing request are transmitted from the printing management server 100 to the delivery server 200. Thus, the printing job information (printing data information) in which the immediate printing flag concerning the logged-in user is "ON" and the printing request are received by the delivery server 200. The printing data is identified according to the printing job information (printing data information (for example, printing data identification information)) (immediate printing data identification). After then, the flow advances to the step S6007 and the step S5004 in FIG. 14. If the flow advances to the step S5004, the identified printing data is output in the step S5006 (second output).

(Step S6007) In the printing management server 100, the printing job information which indicates that the immediate printing flag is "ON" is deleted from the printing job information list (printing data information list) concerning the logged-in user. That is, the printing job information list is updated to the printing job information list (printing data information list) in which the immediate printing flag is not "ON", by the printing management server 100.

Incidentally, in the printing management server 100, the updated printing job information list (printing data information list) is not overwritten on the printing job information 120, because there is a possibility that the properly updated information such as the reserved printing flag or the like is destructed.

(Step S6008) The printing job information list (printing data information list) concerning the logged-in user in which the immediate printing flag is not "ON" is transmitted from the printing management server 100 to the printer 600-1. Thus, the printing job information list (printing data information list) concerning the logged-in user in which the immediate printing flag is not "ON" is received by the printing program 194 of the printer 600-1. Incidentally, all the items in the printing job information 120 may be transmitted and received. Alternatively, only the necessary item in the printing job information 120 may be transmitted and received.

(Step S6009) Under the control of the printing program 194 of the printer 600-1, the printing job information list (printing data information list) received from the printing management server 100 is displayed on the screen 330 of the operation unit 308. Here, it should be noted that the displaying of the printing job information list (printing data information list) on the screen 330 of the operation unit 308 was already described with reference to FIGS. 17 to 20.

(Step S6010) It is judged based on the printing program 194 of the printer 600-1 whether or not the printing job information to which the reserved printing flag is "ON" exists in the printing job information list (printing data information list). If it is judged that the printing job information to which the reserved printing flag is "ON" exists in the printing job information list (printing data information list), the flow advances to a step S6011. On the other hand, if it is judged that the printing job information to which the reserved printing flag is "ON" does not exist in the printing job information list (printing data information list), the flow advances to the step S3011 in FIG. 12.

(Step S6011) Under the control of the printing program 194 of the printer 600-1, the printing job information to which the reserved printing flag is "ON" is set to be in a selected state, in the printing job information list (printing data information list) displayed on the screen 330 of the operation unit 308. After then, the flow advances to the step S3011 in FIG. 12.

(7-2: in a Case where Printer 600 of Login Source is Non-Screen Printer 600-2)

Figure 16:
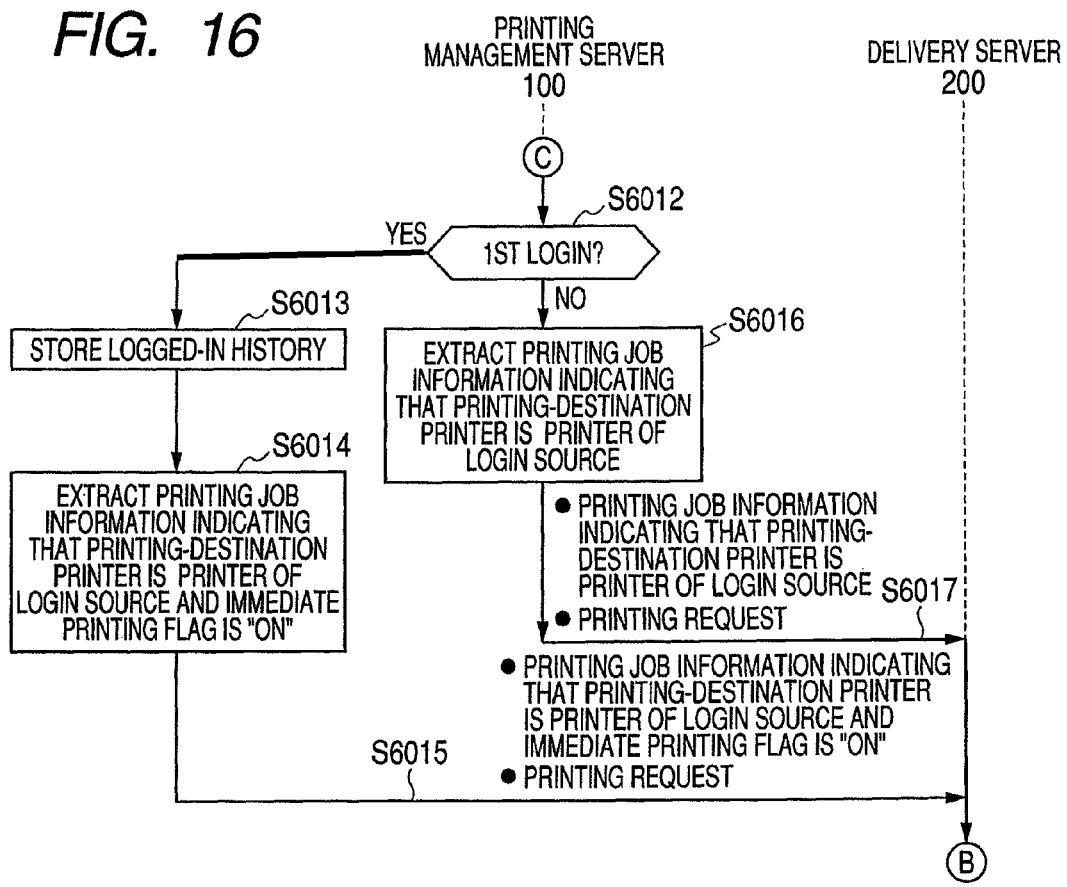
FIG. 16 is a flow chart indicating an operation of the printing control system 1 in a case where the printer 600 of the login source is a printer 600-2 having no screen.

FIG. 16 is the flow chart indicating an operation of the printing control system 1 in a case where the printer 600 of the login source is the non-screen printer 600-2.

Here, it should be noted that the respective steps in the process of the flow chart illustrated in FIG. 16 are achieved if the CPU 201 of the printing management server 100 performs on the RAM 203 the execution program 191 stored in the external memory 211, and if the CPU 301 of the printer 600 performs on the RAM 302 the printing program 194 stored in the HDD 304.

(Step S6012) It is judged by the printing management server 100 whether or not the logged-in user information 140 received from the printer 600-2 concerns a first login operation. If it is judged by the printing management server 100 that the logged-in user information 140 received from the printer 600-2 concerns the first login operation, the flow advances to a step S6013. On the other hand, if it is judged by the printing management server 100 that the logged-in user information 140 received from the printer 600-2 does not concern the first login operation, the flow advances to a step S6016.

Here, it should be noted that the process in the step S6012 is to identify how many times the logged-in user information 140 is received from the printer 600-2 within a predetermined time. For example, if the logged-in user information 140 is received 15 seconds after the identical logged-in user information 140 is received at the first time, the flow advances to the step S6016.

More specifically, the printing management server 100 has a logged-in history storage unit which stores therein the past-received logged-in user information 140. If the logged-in user information 140 is received by the printing management server 100, the logged-in user information stored in the logged-in history storage unit and the received logged-in user information are compared with each other. Then, if the logged-in user information stored in the logged-in history storage unit coincides with the received logged-in user information, the received logged-in user information does not concern the first login operation, and the flow advances to the step S6016. Incidentally, if a predetermined time (for example, 15 seconds) elapses after the logged-in user information 140 was stored in the logged-in history storage unit, the relevant logged-in user information 140 is deleted from the logged-in history storage unit.

In this case, it is preferable to output and display a message "YOU CAN PRINT PRINTING DATA OF DELIVERY SERVER IF YOU LOG IN WITHIN 15 SECONDS" on the text display section on the operation unit 308 of the printer 600-2. Alternatively, the relevant message may be output by voice.

(Step S6013) The logged-in user information 140 is stored as the logged-in history in the logged-in history storage unit of the printing management server 100.

(Step S6014) In the printing management server 100, the printing job information which indicates that the printing-destination printer 600 is the printer 600-2 of the login source and the immediate printing flag is "ON" is extracted by referring to the printing job information 120, according to the received printing job information (document ID (printing data identification information)).

(Step S6015) The printing job information (document ID (printing data identification information)) in which the printing-destination printer 600 is the printer 600-2 of the login source and the immediate printing flag is "ON" and the printing request are transmitted from the printing management server 100 to the delivery server 200. Thus, the printing job information (document ID (printing data identification information)) in which the printing-destination printer 600 is the printer 600-2 of the login source and the immediate printing flag is "ON" and the printing request are received by the delivery server 200. Then, the flow advances to the step S5004 in FIG. 14.

(Step S6016) In the printing management server 100, the printing job information which indicates that the printing-destination printer 600 is the printer 600-2 of the login source is extracted by referring to the printing job information 120 (that is, the printing job information which indicates that the immediate printing flag is not "ON" is extracted).

(Step S6017) The printing job information (document ID (printing data identification information)) in which the printing-destination printer 600 is the printer 600-2 of the login source and the printing request are transmitted from the printing management server 100 to the delivery server 200. Thus, the printing job information (document ID (printing data identification information)) in which the printing-destination printer 600 is the printer 600-2 of the login source and the printing request are received by the delivery server 200. Then, the flow advances to the step S5004 in FIG. 14.

(7-3: Main Effect)

As just described, in the printing control system according to the second embodiment, if the printer 600 of the login source is the screen printer 600-1, it is possible to perform the printing operation by displaying the printing job information list (printing data information list) on the screen printer 600-1. On the other hand, if the printer 600 of the login source is the non-screen printer 600-2, the printing control system causes to perform the printing for the printing job information corresponding to the immediate printing if the login operation is the first login operation, and causes to perform the printing wholly for the printing job information concerning the logged-in user if the login operation is the second or more login operation. Therefore, if the setting such as the immediate printing or the like in the non-screen printer 600-2 is performed by the screen printer 600-1, the printing form can be changed for each printing job information even by the non-screen printer 600-2 incapable of displaying the printing job information list (printing data information list).

(8: Effect of Present Invention)

As just described in detail, in the printing control system according to the present invention, the whole of the printing job information concerning the logged-in user is displayed on the printer of the login source, it is possible for the user to confirm the whole printing data print-instructed by the user by confirming the screen of any one of the printers provided in the printing control system. Therefore, even if the user forgets the printer via which he/she instructed the printing, it is unnecessary for the user to search for the printing data as moving about the plural printers.

Further, since the printing job information which cannot be printed by the printer of the login source or can be printed by another printer can be print-instructed by changing the printing-destination printer from the relevant printer of the login source, it is unnecessary for the user to go back to the own client terminal and again perform the printing operation. Furthermore, even if the printing of the printing data is instructed to the printer in which a failure occurred, the user can cope with such an emergency situation by changing the printing-destination printer to another available printer.

Furthermore, if the printing-destination printer is changed, it is possible to designate the immediate printing and/or the reserved printing. Therefore, it is possible reduce an operation load even if the printing-destination printer is changed.

Furthermore, if the printing data is the printing data having the format depending on the printer, it causes the printer to which the printing of the relevant printing data was instructed to perform the printing. On the other hand, if the printing data is the printing data having the format not depending on the printer, it causes the printer to perform the printing via the printer driver corresponding to the relevant printer. Consequently, it is possible to easily print the data having various formats.

Furthermore, if the immediate printing and the like with respect to the non-screen printer are set by the screen printer, it is possible for the non-screen printer incapable of displaying the printing job information list (printing data information list) to change the printing form for each printing job information. Therefore, it is possible to configure the printing control system according to the present invention even if the screen printer and the non-screen printer mixedly exist.

As above, while the exemplary embodiments for the printing control system according to the present invention have been described with reference to the attached drawings, the present invention is not limited to the disclosed exemplary embodiments. That is, it is apparent that a person skilled in the field of the art to which the present invention belongs can conceive various changes and modifications of the present invention within the scope of the technical concept disclosed in the present application, and it is naturally understood that these changes and modification are within the technical scope of the present invention.

This application claims the benefit of Japanese Patent Application No. 2007-333706, filed Dec. 26, 2007, which is hereby incorporated by reference herein in its entirety.

What is claimed is:

1. A printing control system in which a printing control server for managing user identification information of a user and printing data so that the user identification information and the printing data are correspondent and an image forming apparatus for printing the printing data can communicate with each other via a network, wherein, the printing control server comprises:

a storage unit adapted to store the user identification information, the printing data and image forming apparatus identification information of an image forming apparatus to print the printing data, so that the user identification information, the printing data and the image forming apparatus information are correspondent;

a user identification information reception unit adapted to receive the user identification information from the image forming apparatus; and a list transmission unit adapted to, according to the user identification information received by the user identification information reception unit, transmit a list of printing data corresponding to the user identification information, including the image forming apparatus identification information of each image forming apparatus to print the printing data corresponding to the user identification information to the image forming apparatus; and wherein, the image forming apparatus comprises:

a user identification information transmission unit adapted to transmit the user identification information to the printing control server;

a list reception unit adapted to receive the list of printing data including the image forming apparatus identification information from the printing control server;

a discriminating unit adapted to, according to the image forming apparatus identification information, discriminate printing data to be printed by the image forming apparatus and printing data not to be printed by the image forming apparatus; and a display unit adapted to, according to a result of discrimination by the discriminating unit, display information of the printing data so that the printing data to be printed by the image forming apparatus and the printing data not to be printed by the image forming apparatus can be discriminated from each other.

2. A printing control system according to claim 1, wherein the image forming apparatus further comprises a printing data selection unit adapted to select the printing data in the list of printing data received by the list reception unit.

3. A printing control system according to claim 2, wherein, the image forming apparatus further comprises:

an image forming apparatus selection unit adapted to select the image forming apparatus for printing the printing data selected by the printing data selection unit; and an image forming apparatus information transmission unit adapted to transmit, to the printing control server, the image forming apparatus identification information of the image forming apparatus selected by the image forming apparatus selection unit, and printing data identification information of the printing data selected by the printing data selection unit; and wherein, the printing control server further comprises:

an image forming apparatus information reception unit adapted to receive the image forming apparatus identification information and the printing data identification information; and an image forming apparatus information changing unit adapted to, according to the image forming apparatus identification information and the printing data identification information received by the image forming apparatus information reception unit, change the image forming apparatus information stored in the storage unit so as to print the printing data corresponding to the received printing data identification information by the image forming apparatus corresponding to the received image forming apparatus identification information.

4. A printing control system according to claim 2, wherein, the image forming apparatus further comprises:
- a selected printing data information transmission unit adapted to transmit printing data identification information of the printing data selected by the printing data selection unit; and wherein, the printing control server further comprises:
- selected printing data information reception unit adapted to receive the printing data identification information of the selected printing data; and
- a first output unit adapted to, according to the printing data identification information received by the selected printing data information reception unit, output the printing data corresponding to the printing data identification information to print the printing data by the image forming apparatus.

5. A printing control system according to claim 3, wherein the image forming apparatus selection unit selects immediate printing or reserved printing of the printing data in a case where the image forming apparatus for printing the printing data is changed.

6. A printing control system according to claim 1, wherein the display unit selects the printing data to which reserved printing has been set and displays the information of the selected printing data.

7. A printing control system according to claim 1, wherein the printing control server further comprises:
- an immediate printing data specifying unit adapted to specify the printing data which corresponds to the user identification information received by the user identification information reception unit and to which the immediate printing has been set; and
- an output unit adapted to output the printing data specified by the immediate printing data specifying unit to print the specified printing data by the image forming apparatus.

8. A printing control system according to claim 5, wherein,.
- the image forming apparatus information transmission unit transmits setting information indicating the immediate printing or the reserved printing selected by the image forming apparatus selection unit,
- the storage unit stores therein the setting information indicating the immediate printing or the reserved printing,
- the image forming apparatus information reception unit receives the setting information indicating the immediate printing or the reserved printing, and wherein, the printing control server further comprises:
- a setting information updating unit adapted to update the setting information indicating the immediate printing or the reserved printing corresponding to the printing data stored by the storage unit, by the setting information received by the image forming apparatus information reception unit.

9. A printing control system according to claim 7, wherein, in a case where the printing data is the printing data having a format depending on the image forming apparatus for printing the printing data, the output unit outputs the printing data to the image forming apparatus, and
in a case where the printing data is the printing data having a format not depending on the image forming apparatus for printing the printing data, the output unit outputs the printing data via a printer driver corresponding to the image forming apparatus for printing the printing data.

10. A printing control system according to claim 1, wherein,
the printing control server comprises:
- a printing management server which is equipped with the storage unit;
- a delivery server which accumulates and delivers the printing data stored by the storage unit; and
- an authentication server which performs authentication of the user.

11. An image forming apparatus which can communicate via a network with a printing control server for managing user identification information of a user and printing data so that the user identification information and the printing data are correspondent, and which performs printing of the printing data, the image forming apparatus comprising:
- a user identification information transmission unit adapted to transmit the user identification information to the printing control server;
- a list reception unit adapted to receive a list of the printing data corresponding to the user identification information transmitted by the user identification information transmission unit, including image forming apparatus identification information of each image forming apparatus to print the printing data corresponding to the user identification information, from the printing control server;
- a discriminating unit adapted to, according to the image forming apparatus identification information, discriminate printing data to be printed by the image forming apparatus and printing data not to be printed by the image forming apparatus; and
- a display unit adapted to, according to a result of discrimination by the discriminating unit, display information of the printing data so that the printing data to be printed by the image forming apparatus and the printing data not to be printed by the image forming apparatus can be discriminated from each other.

12. A printing control method in a printing control system in which a printing control server which manages user identification information of a user and printing data so that the user identification information and the printing data are correspondent and an image forming apparatus for printing the printing data can communicate with each other via a network, and which comprises a storage unit adapted to store the user identification information, the printing data and image forming apparatus identification information of an image forming apparatus to print the printing data, so that the user identification information, the printing data and the image forming apparatus identification information are correspondent, the method comprising:
the printing control server performing the steps of:
- receiving the user identification information from the image forming apparatus; and
- transmitting, according to the received user identification information, a list of printing data corresponding to the user identification information, including the image forming apparatus identification information of each image forming apparatus to print the printing data corresponding to the user identification information to the image forming apparatus; and the image forming apparatus performing the steps of:
- transmitting the user identification information to the printing control server;
- receiving the list of printing data including the image forming apparatus identification information from the printing control server;
- discriminating, according to the image forming apparatus identification information, printing data to be printing by the image forming apparatus and printing data not to be printed by the image forming apparatus; and displaying, according to a result of the discrimination, information of the printing data, so that the printing data to be printed by the image forming apparatus and the printing data not to be printed by the image forming apparatus can be discriminated from each other.

13. A printing control method in an image forming apparatus which can communicate via a network with a printing control server for managing user identification information of a user and printing data so that the user identification information and the printing data are correspondent, and which performs printing of the printing data, the printing control method comprising the steps of:

transmitting the user identification information to the printing control server;

receiving a list of the printing data corresponding to the transmitted user identification information, including image forming apparatus identification information of each image forming apparatus to print the printing data corresponding to the user identification information, from the printing control server;

discriminating, according to the image forming apparatus identification information, printing data to be printing by the image forming apparatus and printing data not to be printed by the image forming apparatus; and displaying, according to a result of the discrimination, information of the printing data so that the printing data to be printed by the image forming apparatus and the printing data not to be printed by the image forming apparatus can be discriminated from each other.

14. A printing control system according to claim 1, wherein the list of printing data is a list of information of the printing data.

15. A printing control system according to claim 14, wherein the information of the printing data includes at least one of identification information of the printing data, a name of the printing data, and a type of the printing data.

16. A printing control system according to claim 1, wherein the displayed information of the printing data includes at least one of a name of the printing data and a type of the printing data.

17. A printing control system according to claim 1, wherein the printing control server further comprises a list forming unit adapted to, according to the user identification information received by the user identification information reception unit, form the list of printing data corresponding to the user identification information, including the image forming apparatus identification information of the image forming apparatus to print the printing data corresponding to the user identification information.

18. A printing control system according to claim 1, wherein, the image forming apparatus further comprises:

an immediate printing designating unit adapted to designate an immediate printing of the printing data which is to be printed by another image forming apparatus;

a printing data reception unit adapted to receive the printing data to which the immediate printing is set from the printing control server; and a printing unit adapted to print the printing data received by the printing data reception unit; and wherein, the printing control server further comprises:

an immediate printing setting unit adapted to, according to the designation of the immediate printing of the printing data, set the immediate printing to the printing data;

an immediate printing determining unit adapted to, according to the user identification information received by the user identification information reception unit, determine whether there is printing data which corresponds to the received user identification information and to which the immediate printing is set; and a printing data transmitting unit adapted to, if the immediate printing determining unit determines that there is the printing data, transmits to the image forming apparatus the printing data which corresponds to the received user identification information and to which the immediate printing is set.

* * * * *